United States Patent [19]

Mitomo et al.

[11] Patent Number: 5,401,450
[45] Date of Patent: Mar. 28, 1995

[54] BETA-SILICON NITRIDE SINTERED BODY AND METHOD OF PRODUCING SAME

[75] Inventors: Mamoru Mitomo, Tsukuba; Naoto Hirosaki, Yokohama; Motohide Ando, Yokosuka, all of Japan

[73] Assignees: Nissan Motor Co., Ltd, Yokohama; National Institute for Research in Inorganic Materials, Tsukuba, both of Japan

[21] Appl. No.: 992,657

[22] Filed: Dec. 18, 1992

[30] Foreign Application Priority Data

Dec. 20, 1991 [JP] Japan .................................. 3-338833
Dec. 20, 1991 [JP] Japan .................................. 3-338844
Mar. 10, 1992 [JP] Japan .................................. 4-050993

[51] Int. Cl.$^6$ ............................................. C04B 35/58
[52] U.S. Cl. ........................................ 264/65; 501/97; 501/98
[58] Field of Search ........................ 264/65; 501/98, 97

[56] References Cited

U.S. PATENT DOCUMENTS 5,017,530  5/1991  Arakawa ................................. 501/98
5,122,485  6/1992  Akimune ................................ 501/98

FOREIGN PATENT DOCUMENTS 58-151371   9/1983  Japan .
58-49509   11/1983  Japan .
2-255573   10/1990  Japan .

OTHER PUBLICATIONS

Abstract of DE 3141590.
Journal of Materials Science 11(1976) 1103–1107.
Journal of the American Ceramic Society, vol. 57, No. 1 (pp. 25–29).
Ceramic. Eng. Sci. Proc. 10[7–8]pp. 632–645.

*Primary Examiner*—James Derrington
*Attorney, Agent, or Firm*—Foley & Lardner

[57] ABSTRACT

A high strength and toughness $\beta$-silicon nitride sintered body suitable for the material of a variety of structural parts. The sintered body contains $\beta$-silicon nitride ($Si_3N_4$) in an amount not less than 95% by weight of total silicon nitride; oxygen in a total amount not more than 3% by weight of the sintered body; and columnar grains each of which has a diameter not less than 5 $\mu$m and an aspect ratio not less than 5, the columnar grains being in an amount not less than 0.5% by volume of total of raw materials in the sintered body; the sintered body having a bulk density not less than 96% of a theoretical density. Such a sintered body is produced by a method comprising the following steps in the sequence set forth: preparing powder of a starting material including $\beta$-silicon nitride in an amount not less than 80% by weight of the starting material; adding oxide of at least one element selected from the group IIIa of the periodic table of elements in an amount ranging from 0.2% to 6% by weight (as a sintering assistant) to the starting material powder to form a mixture powder; compacting the mixture powder to form a compact; firing the compact under a nitrogen gas pressure ranging from 1 to 500 atm. at a temperature ranging from 1700° to 2100° C. to form the sintered body; and continuing the firing step until a bulk density of the sintered body reaches a value not less than 96% of a theoretical density of the sintered body.

2 Claims, 1 Drawing Sheet

BETA-SILICON NITRIDE SINTERED BODY AND METHOD OF PRODUCING SAME

BACKGROUND OF THE INVENTION

1. Field of the Invention

This invention relates to a β-silicon nitride sintered body which is a so-called fine ceramic material high in fracture toughness and strengths and serves as a variety of mechanical and structural parts extensively used in the fields of automotive vehicle, machine parts, chemical apparatus and aerospace instrument, and to a method of producing such a β-silicon nitride sintered body by using inexpensive β-silicon nitride as the raw material.

2. Description of the Prior Art

A sintered body formed of silicon nitride based material is chemically stable and has high mechanical strengths at ordinary and high temperatures. Accordingly, the sintered body is suitable for sliding parts such as a bearing and engine parts such as a rotor of a turbocharger.

It has been hitherto a common opinion in the field of ceramics that a raw material having α-silicon nitride as a main component is necessary to obtain a high strength silicon nitride sintered body. In general, commercially available powder containing 90% by weight or more of α-silicon nitride has been used as the raw material for the sintered body. Such a raw material powder containing α-silicon nitride has been used to produce a β-silicon nitride sintered body for the reasons set forth below.

(a) α-silicon nitride is usually in the form of fine powder and therefore high in sinterability.

(b) α-silicon nitride makes its phase transition from α-phase to β-phase during sintering and therefore columnar crystal therein develops so as Co raise its strength and toughness. However, the above discussed conventional silicon nitride requires to control the content of α-phase in powder of the raw material. This unavoidably complicates a preparation process of the raw material thereby raising cost of the raw material.

On the other hand, a silicon nitride powder of which main component is β-silicon nitride has been known as being used a raw material for refractory products. Additionally, a sintered body from β-silicon nitride is known and disclosed, for example, in J. Am. Ceram. Soc. Vol. 57, page 25, 1974 and in Japanese Patent Provisional Publication No. 58-151371. However, β-silicon nitride is relatively coarse or large in particle size, and additionally is low in content of α-silicon nitride. Accordingly, with such silicon nitride powder, no columnar texture cannot be formed in the sintered body so as not to provide a high strength to the sintered body. As a result, the silicon nitride powder including β-silicon nitride as the main component has not been used as the raw material for producing a high strength β-silicon nitride sintered body.

In view of the above, one of the inventors of this application has previously developed and proposed a gas pressure sintering method in which sintering becomes possible at a high temperature under a high nitrogen gas pressure, as disclosed in Japanese Patent No. 1,247,183. Additionally, it has been demonstrated that according to the gas pressure sintering method, sintering a high density can be made even upon using β-silicon nitride powder which has been conventionally deemed to be low in sinterability, as disclosed in J. Materials Science, Vol. 11, pages 1103 to 1107, 1976 and in Japanese Patent Publication No. 58-151371. Furthermore, one of the inventors has proposed that a high strength β-silicon nitride can be obtained by controlling the particle size distribution of high purity β-silicon nitride powder, as disclosed in Japanese Patent Provisional Publication No. 2-255573.

However, difficulties have been encountered even in the above discussed techniques developed by one of the inventors, in which columnar structure cannot be effectively developed in the sintered body so that the sintered body is not sufficient in strength, and a precision control of particle size distribution is required for the high purity β-silicon nitride powder as the starting material.

SUMMARY OF THE INVENTION

It is an object of the present invention to provide a β-silicon nitride sintered body which is high in strength and toughness by using inexpensive β-silicon nitride powder as a raw or starting material without using a complicated production process, thereby lowering a production cost and simplifying a production process.

Another object of the present invention is to provide an improved β-silicon nitride sintered body which is sufficiently high in strength and toughness and produced by using inexpensive β-silicon nitride power as a raw material, overcoming drawbacks encountered in prior art β-silicon nitride sintered bodies.

A further object of the present invention is to provide an improved method of producing the β-silicon nitride sintered body which method can provide the improved β-silicon nitride-sintered body by inventing the kind and adding amount of a sintering assistant(s) and a firing condition without carrying out a precision control of particle size distribution for a high purity β-silicon nitride powder, overcoming drawbacks encontered in prior art production methods of β-silicon nitride sintered body.

An aspect of the present invention resides in a β-silicon nitride sintered body comprising: β-silicon nitride ($Si_3N_4$) in an amount not less than 95% by weight of total silicon nitride; oxygen in a total amount not more than 3% by weight of the sintered body; and columnar grains each of which has a diameter not less than 5 $\mu$m and an aspect ratio not less than 5, the columnar grains being in an amount not less than 0.5% by volume of the sintered body; the sintered body having a bulk density not less than 96% of a theoretical density.

Another aspect of the present invention resides in a method of producing the above β-silicon nitride sintered body, comprising the following steps in the sequence set forth: preparing powder of a starting material including β-silicon nitride in an amount not less than 80% by weight of the starting material; adding oxide of at least one element selected from the group IIIa of the periodic table of elements in an amount ranging from 0.2% to 6% by weight (as a sintering assistant) to the starting material powder to form a mixture powder; compacting the mixture powder to form a compact; firing the compact under a nitrogen gas pressure ranging from 1 to 500 atm. at a temperature ranging from 1700° to 2100° C. to form the sintered body; and continuing the firing step until a bulk density of the sintered body reaches a value not less than 96% of a theoretical density of the sintered body.

As discussed above, according to the present invention, the sintered body has the β-silicon nitride in an amount not less than 95% by weight of total silicon nitride, and therefore sufficiently high in strength and toughness. Additionally, the sintered body has oxygen in the total amount not more than 3% by weight, so that the amount of grain boundary phase is lowered thereby to improve the toughness of the sintered body. Furthermore, the bulk density of the sintered body is not less than 96% of a theoretical density and therefore high in strength. Moreover, the sintered body contains columnar grains (each of which has a diameter not less than 5 μm and the aspect ratio not lower than 5) in an amount of not less than 0.5% by volume of the sintered body. By virtue of this, the sintered body serves as a kind of composite material, so that the sintered body is further improved in strength and toughness and small in scattering in strength of the sintered body. Thus, the present invention can provide a high performance β-silicon nitride sintered body.

DETAILED DESCRIPTION OF THE INVENTION

Figure 1:
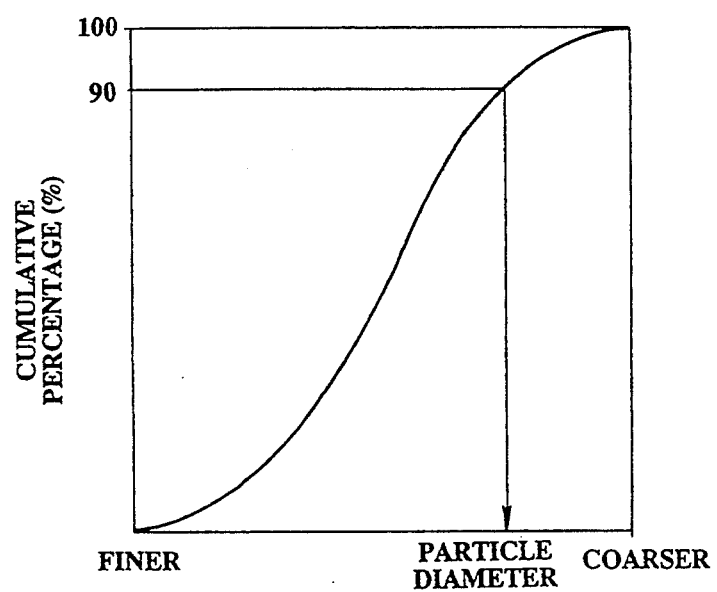
FIG. 1 (the single FIGURE) is a graph showing a particle size distribution of a fine powder used in Examples 3-11 to 3-13 and Comparative examples 3-11 and 3-12.

According to the present invention, a β-silicon nitride sintered body comprising: β-silicon nitride ($Si_3N_4$) in an amount not less than 95% by weight of total silicon nitride; oxygen in a total amount not more than 3% by weight of the sintered body; and columnar grains each of which has a diameter not less than 5 μm and an aspect ratio not lower than 5, the columnar grains being in an amount not less than 0.5% by volume of the sintered body; the sintered body having a bulk density not less than 96% of a theoretical density. It is prerable that the sintered body has a Weibull modulus not less than 20.

The above β-silicon nitride sintered body is produced by a method comprising the following steps in the sequence set forth: preparing powder of a starting material including β-silicon nitride in an amount not less than 80% by weight of total silicon nitride; adding oxide of at least one element selected from the group IIIa of the periodic table of elements in an amount ranging from 0.2% to 6% by weight (as a sintering assistant) to the starting material powder to form a mixture powder; compacting the mixture powder to form a compact; firing the compact under a nitrogen gas pressure ranging from 1 to 500 atm. at a temperature ranging from 1700° to 2100° C. to form the sintered body; and continuing the firing step until a bulk density of the sintered body reaches a value not less than 96% of a theoretical density of the sintered body.

The β-silicon nitride sintered body of the present invention has a high fracture toughness and an excellent mechanical strength and serves as so-called fine ceramics. The thus obtained β-silicon nitride sintered body contains therein columnar crystal having a diameter not less than 5 μm and an aspect ratio not less than 5, and therefore serves as a kind of composite material high in strength and toughness. Since the sintered body preferably has a large Weibull modulus, the scattering in strength of the sintered body is small thereby providing a high reliability material for ceramic products.

The above-mentioned aspect ratio means a ratio of a longest dimension (longer axis diameter or length of grain) to a shortest dimension (longer axis diameter or diameter of grain) of each columnar grain.

The above-mentioned bulk and theoretical densities are defined as follows:

The bulk density of the sintered body is determined by the following equation:

Bulk density = A / V where A is the weight of the sintered body in the air; and V is the volume of the sintered body and given by the following equation:

Volume = (A − B) / C where B is the weight of the sintered body in water; and C is the density of water.

The theoretical density of the sintered body is determined by the following equation:

Theoretical density = Tw / Tv where Tw is the total weight of the raw materials (such as silicon nitride and the sintering assistant); and Tv is the total of theoretical volumes of the raw materials, the theoretical volume of each raw material being given by the following equation:

Theoretical volume = w / $g_s$ where w is the weight of the raw material; and $g_s$ is the specific gravity of the raw material.

Additionally, the above-mentioned Weibull modulus is defined as follows:

In general, the dispersion in strength of a ceramic is represented as "Weibull modulus". According to Weibull statistics, a failure (fracture) probability F has a distribution given by the following equation:

$$F = 1 - \exp\left\{ -\int_V \left(\frac{\sigma}{\sigma_0}\right)^m dV \right\}$$

where σ is a strength; V is a volume; and $\sigma_0$ is a constant.

The Weibull modulus is defined as "m" in the above equation and therefore the distribution is smaller as the value of m is larger. In general, a high strength structural ceramic has a Weibull modulus of 10 to 20, and even a carefully produced ceramic has a Weibull modulus of 20 to 30.

In production of the β-silicon nitride sintered body of the present invention, silicon nitride powder including α-silicon nitride and β-silicon nitride are used as a starting material, in which the silicon nitride powder contains not less than 80% by weight of β-silicon nitride. Selection of sintering assistants and firing condition in the producing method of the present invention is made in accordance with sintering characteristics of β-silicon nitride, and therefore abnormal grain growth occurs to lower the strength of a resultant sintered body in case that the content of α-silicon nitride increases. In this regard, the silicon nitride powder containing β-silicon nitride in an amount not less than 80% by weight is used as the starting material. In this case, although the particle size of the starting materiel is not particularly specified, it is preferable to pulverize and classify β-silicon nitride powder to have a mean particle diameter not larger than 1.0 μm because β-silicon nitride powder is generally coarse or large in particle size.

As a sintering assistant(s), an oxide of at least one element selected from the group IIIa of the periodic table of elements is added to powder of the starting material. Although the oxide of the element(s) of the group IIIa is necessary to be added in the present invention, it may be made to add, to the starting material, oxides such as MgO, Al2O3 and/or the like other than the above oxides of the group IIIa elements, and/or nitride such as AlN and/or the like, if necessary.

The amount of addition of the sintering assistant(s) is so decided that the content of oxygen in the resultant sintered body is not more than 3% by weight. In this connection, the amount of the sintering assistant to be added to the starting material powder is selected to be within a range of from 0.2 to 6% by weight, in which the addition amount changes depending upon the content in the starting material powder. In this case, if the addition amount of the sintering assistant is less than 0.2% by weight, an effect of forming a micro structure of the sintered body is less thereby providing an undesirable result. If the addition amount of the sintering assistant exceeds 6% by weight, the amount of a formed liquid phase is too large thereby causing a void defect in the sintered body, thus providing an undesirable effect.

Additionally, the addition amount of the sintering assistant affects growth of grain in the sintered body. This grain growth proceeds in such a manner that small grains dissolve in a liquid phase and precipitates as large grains. In this process, if the amount of the liquid phase is larger, a distance required for diffusion becomes larger and therefore the grain growth is retarded. In such an amount of the liquid phase that the condition the oxygen content in the sintered body is not more than 3% by weight, large grains are close to small grains thereby promoting the grain growth so that columnar grain develops. As a result, the β-silicon nitride having the structure according to the present invention is obtained. Thus, the sintering assistant(s) is necessarily added to the starting material to form a mixture of raw materials.

In order to fabricate or compact the raw material mixture into a desirable shape to obtain a compact, isostatic pressing, injection molding, casting or the like are employed. Firing of the thus obtained compact is carried out in the atmosphere of nitrogen at a nitrogen gas pressure within a range between 1 to 500 atm. and at a temperature within a range between 1700° and 2100° C. In this firing step, nitrogen gas forming the atmosphere is necessary for preventing a thermal decomposition of silicon nitride, in which the pressure of the nitrogen gas atmosphere is raised as the firing temperature is raised. A necessary lowest value of the nitrogen gas atmosphere pressure is 1 atm. in firing at a temperature between 1700° C. and 1750° C., 5 atm. in firing at a temperature of 1900° C., and 10 atm. in firing at a temperature of 2000° C. If the pressure of the atmosphere is lower than the above-mentioned predetermined range (1 to 500 atm.), silicon nitride makes its thermal decomposition releasing nitrogen so as to be converted to silicon. This is not desirable. In the firing step, the firing of the compact is accomplished until the bulk density of the sintered body reaches to the predetermined value not less than 96% of the theoretical density of the same. Upon completion of the firing step, the β-silicon nitride sintered body is obtained.

Thus, the firing is carried out under the nitrogen gas pressure between 1 atm. and 500 atm. and at the temperature between 1700° C. and 2100° C. Additionally, the firing is continued until the compact reaches the following conditions of the sintered body: β-silicon nitride occupies 95% by weight of the total silicon nitride; the columnar grains having the (shorter axis) diameter not less than 5 μm and the aspect ratio not less than 5 occupies 0.5% by volume of the sintered body; and the bulk density of the compact reaches the value not less than 96% of the theoretical value. Although the firing time changes depending upon the firing temperature, kind and amount of the sintering assistants to be used, and the like, it is to be noted that β-silicon nitride sintered body meeting the above conditions can be obtained under firing for 1 to 4 hours.

In order to meet a condition that the total oxygen content in the sintered body is not more than 3% by weight, the addition amount of the sintering assistant(s) and conditions of the firing are selected. Here, the total oxygen content in the sintered body is originated from the oxygen impurity in the starting material and the added sintering assistant(s). Accordingly, the addition amount of the sintering assistant(s) should be determined taking account of the amount of the oxygen impurity. It is to be noted that not all oxygen in the starting materials remaing in the sintered body, so that a part of oxygen in SiO2 volatilizes to reduce the oxygen content. If the total oxygen content in the sintered body exceeds 3% by weight, the amount of grain boundary phase increases thereby lowering the value of the toughness of the resultant sintered body.

As discussed above, the resultant sintered body includes columnar grains which are not less than 0.5% by volume of the total raw materials or sintered body and have the (shorter axis) diameter not less than 5 μm and the aspect ratio not less than 5. The amount (vol %) of the columnar grains are determined as follows: A specimen is prepared by etching the polished surface of the sintered body so that the shape of silicon nitride can be observed. Then, the etched polished surface of the sintered body is observed by a scanning electron microscope so as to measure the size and distribution of the columnar grains. The amount (vol %) of the columnar grains is calculated in accordance with the measured size and distribution. If β-silicon nitride is less than 95% by weight of the total silicon nitride in the sintered body, the strength and toughness of the sintered body is lowered. If the above columnar grains are less than 0.5% by weight of the total raw materials, development of columnar crystal is insufficient thereby lowering the strength and toughness of the sintered body. Additionally, if the bulk density of the sintered body is less than 96% of the theoretical density, the resultant sintered body is lowered in strength.

To further illustrate this invention, and not by way of limitation, the following examples are given.

EXAMPLE 1-1

To a silicon nitride powder having a mean particle diameter of 2.5 μm and a maximum particle diameter of 20 μm and including 99% by weight of β-silicon nitride, water and beads of a silicon nitride sintered body were added to form a mixture. The mixture was pulverized by using an attrition mill and thereafter subjected to a particle size control thereby obtaining a powder "A" having a mean particle diameter of 0.5 μm.

Subsequently, 0.8% by weight of yttrium oxide and 1.2% by weight of neodymium oxide were added to the powder "A" as shown in the column of Example 1-1 in Table 1 and mixed for 2 hours by usig a ball mill. Then, the thus mixed powder "A" was dried in the air by using a spray dryer, and thereafter compacted at a pressure of 20 MPa by using a metallic mold. Thereafter, the thus compacted powder "A" was further compacted by using a so-called rubber pressing or isostatic pressing under a pressure of 200 MPa thereby obtaining a compact having a dimension of 6 mm×6 mm ×50 mm. This compact was fired in a gas pressure furnace formed of graphite, under a nitrogen gas pressure of 100 atm and at a temperature of 1900° C. for 4 hours thereby obtaining a sintered body of Example 1-1.

Thereafter, the bulk density of the sintered body of Example 1 was measured according to a so-called Archemedes' method using water. Further, each sintered body was machined or ground to form flat surfaces by using a diamond wheel of 800 mesh thus obtaining a specimen having a dimension of 3 mm×4 mm×40 mm. The specimen was subjected to a three-point bending test (at room temperature) according to JIS (Japanese Industrial Standard) R 1601 thereby to measure a flexural strength at room temperature. Additionally, the specimen was subjected to a SEPB (single edge pre-cracked beam) test according to JIS R 1606 thereby to measure a fracture toughness. The SEPB test was conducted as follows: A so-called Vickers' indentation as used in a Vickers hardness test was formed on the surface having the dimension of 3 mm×40 mm, of the specimen. A previous crack was formed from this indentation, and then fracture of the specimen was made upon being originated from the previous crack. The method of SEPB test is also discussed by T. Nose and T. Fujii in J. Am. Ceram. Soc. Vol. 71(5), pages 328-333, 1988. Furthermore, the above obtained sintered body was pulverized and subjected to a test for measuring the total oxygen content by using an oxygen analyzer produced by LECO Co. The Weibull modulus of the sintered body was also measured and calculated. The results of the measurements of the sintered bodies are shown in the column of Examples 1-1 in Table 2.

As shown in the column of Example 1-1, the above obtained sintered body had 100% by weight of β-silicon nitride and had the bulk density of 99% of the theoretical density. Additionally, it was observed that the amount of the columnar grains having the shorter axis diameter not less than 5 μm and the aspect ratio not less than 5 was 3% by volume of the raw materials or the sintered body. The measured total oxygen content in the sintered body was 0.9% by weight. The room temperature three-point flexural strength took such a high value as 780 MPa. The Weibull modulus of the sintered body also took a such a high value as 30, representing the fact that a scattering of the strength is small. The fracture toughness was 7.7 MPa√m. Additionally, no void defect occurred. Thus, it was experimentally confirmed that excellent β-silicon nitride sintered body having high strength and toughness could be obtained even in case β-silicon nitride was used as the starting material.

COMPARATIVE EXAMPLE 1-1

To the powder "A" obtained in the same manner as that in Example 1-1, 7.3% by weight of yttrium oxide and 10.9% by weight of neodymium oxide were added as shown in the column of the Comparative example 1-1 in Table 3. Then, the powder was pulverized and mixed for 2 hours by using a ball mill. Thereafter, the powder was compacted and fired in the same manner as that in Example 1-1 thereby to obtain a sintered body of Comparative example 1-1.

Additionally, the physical properties of the sintered body were measured in the same manners as those in Example 1-1. The results of the measurements are shown in the column of Comparative example 1-1 in Table 4.

As seen in the column of Comparative example 1-1 in Table 4, the obtained sintered body has 100% of β-silicon nitride and no α-silicon nitride. However, the sintered body had a bulk density which was 90% of the theoretical density and therefore the sintered body was not so densified so that many voids (pores) were observed. Additionally, it was observed that columnar grains having the (shorter axis) diameter not less than 5 μm and the aspect ratio not less than 5 occupied 5% by volume of the total raw materials or the sintered body. Although the fracture toughness of the sintered body was measured to be 6.4 Mpa√m, the three-point flexural strength at room temperature was lowered to 450 MPa because the voids served as a trigger of fracture. The Weibull modulus of the sintered body was as small as 8 so that the scattering in strength was large. The total oxygen content of the sintered body was 4.5% by weight.

EXAMPLES 1-2 to 1-7

To a silicon nitride powder having a mean particle diameter of 10 μm and a maximum particle diameter of 200 μm and including 90% by weight of β-silicon nitride, water and balls of a silicon nitride sintered body were added to form a mixture. The mixture was pulverized for 200 hours by using a ball mill and dried. Thereafter, the dried mixture was subjected to a particle size control under a pulverizing and classification by using a jet pulverizer and a dry type classifier thereby obtaining a powder "B" having a mean particle diameter of 0.7 μm.

Subsequently, a sintering assistant(s) as shown in the columns of Examples 2 to 7 in Table 1 were added in their shown amounts to form a mixture. This mixture was mixed for 2 hours by using the ball mill. Then, the mixture was dried in the air by using a spray dryer, and thereafter compacted at a pressure of 20 MPa by using a metallic mold. Thereafter, the thus compacted mixture (the powder "B") was further compacted by using a so-called rubber pressing or isostatic pressing under a pressure of 200 MPa thereby obtaining a compact having a dimension of 6 mm×6 mm ×50 mm. This compact was fired in a gas pressure furnace formed of graphite, under a firing condition as shown in the column of each of Examples 1-2 to 1-7, thereby obtaining each of sintered bodies of Example 1-2to 1-7.

Thereafter, the bulk density of each sintered body of Examples 1-2 to 1-7 was measured according to a so-called Archemedes' method using water. Further, each sintered body was machined or ground to form flat surfaces by using a diamond wheel of 800 mesh thus obtaining a specimen having a dimension of 3 mm×4 mm ×40 mm. The specimen was subjected to a three-point bending test (at room temperature) according to JIS R 1601 thereby to measure a flexural strength at room temperature. Additionally, the specimen was subjected to a SEPB test according to JIS R 1606 thereby to measure a fracture toughness. The SEPB test was conducted as follows: A so-called Vickers' indentation as used in a Vickers hardness test was formed on the surface having the dimension of 3 mm×40 mm, of the specimen. A previous crack was formed from this indentation, and then fracture of the specimen was made upon being originated from the previous crack. Furthermore, the above obtained sintered body was pulverized and subjected to a test for measuring the total oxygen content by using an oxygen analyzer produced by LECO Co. The Weibull modulus of the sintered body was also measured and calculated. The results of the measurements of each sintered body are shown in the column of each of Examples 1-2 to 1-7 in Table 2.

As seen in the columns of Examples 1-2 to 1-7 in Table 2, the sintered bodies of Examples 1-2 to 1-7 were all high in strengths and had large values of the Weibull modulus so as be small in scattering in the strength. Additionally, the sintered bodies had the high toughness values and were not provided with the void defects. As a result, it was experimentally confirmed that excellent $\beta$-silicon nitride sintered bodies were obtained under the production methods of Examples 1-2 to 1-7.

COMPARATIVE EXAMPLES 1-2 to 1-5

To the silicon nitride powder "B" used in Examples 1-2 to 1-7 or a silicon nitride powder "C" having a mean particle diameter of 0.5 μm and including 50% by weight of $\beta$-silicon nitride, a sintering assistant(s) as shown in the columns of Comparative examples 1-2 to 1-5 in Table 3 were added in their shown amounts to form respective mixtures. Each of these mixtures was mixed for 2 hours by using the ball mill. Then, the mixture was dried in the air by using a spray dryer, and thereafter compacted at a pressure of 20 MPa by using a metallic mold. Thereafter, the thus compacted mixture was further compacted by using a so-called rubber pressing or isostatic pressing under a pressure of 200 MPa thereby obtaining a compact having a dimension of 6 mm×6 mm ×50 mm. This compact was fired in a gas pressure furnace formed of graphite, under a firing condition as shown in the column of each of Comparative examples 1-2 to 1-5, thereby obtaining each of sintered bodies of Comparative examples 1-2 to 1-5.

Thereafter, the bulk density of each sintered body of Comparative examples 1-2 to 1-5 was measured according to a so-called Archemedes' method using water. Further, each sintered body was machined or ground to form flat surfaces by using a diamond wheel of 800 mesh thus obtaining a specimen having a dimension of 3 mm×4 mm×40 mm. The specimen was subjected to a three-point bending test (at room temperature) according to JIS R 1601 thereby to measure a flexural strength at room temperature. Additionally, the specimen was subjected to a SEPB test according to JIS R 1606 thereby to measure a fracture toughness. The SEPB test was conducted as follows: A so-called Vickers' indentation as used in a Vickers hardness test was formed on the surface having the dimension of 3 mm×40 mm, of the specimen. A previous crack was formed from this indentation, and then fracture of the specimen was made upon being originated from the previous crack. Furthermore, the above obtained sintered body was pulverized and subjected to a test for measuring the total oxygen content by using an oxygen analyzer produced by LECO Co. The Weibull modulus of the sintered body was also measured and calculated. The results of the measurements of the respective sintered bodies are shown in the columns of Combative examples 1-2 to 1-5.

As seen in the columns of Comparative examples 1-2 to 1-5 in Table 4, the sintered bodies of Comparative examples were all low in strengths and small in value of the Weibull modulus so as to be large in scattering of the strength. Additionally, the sintered bodies were low in value of the toughness and provided with the void defect.

COMPARATIVE EXAMPLE 1-6

To a $\alpha$-silicon nitride powder "D" including 95% by weight of $\alpha$-silicon nitride, 0.8% by weight of yttrium oxide and 1.2% by weight of neodymium oxide were added as the sintering assistants as shown in the column of Comparative example 1-6 in Table 3 to form a mixture. This mixture was mixed and thereafter compacted under a pressure of 20 MPa by using a metallic mold. Thereafter, the thus compacted mixture was further compacted by using a so-called rubber pressing or isostatic pressing under a pressure of 200 MPa thereby obtaining a compact having a dimension of 6 mm×6 mm×50 mm. This compact was fired in a gas pressure furnace formed of graphite, under a firing condition as shown in the column of Example 1-6 in Table 3, thereby a sintered body of Comparative example 1-6. Under the same methods as in Comparative examples 1-2 to 1-5, the bulk density, three-point flexural strength at room temperature, fracture toughness, and the like of the resultant sintered body were measured. The results of these measurements are shown in the column of Comparative example 1-6 in Table 4.

As seen in the column of Comparative example 1-6 in Table 4, although the resultant sintered body was not formed with voids and high in both the three-point flexural strength and fracture toughness, it was found that the structure of the sintered body was not uniform while the Weibull modulus was small so as to have a large scattering of the strength. This was because $\beta$-silicon nitride was formed through a phase transition from $\alpha$-phase to $\beta$-phase during sintering of $\alpha$-silicon nitride.

Hereinafter, further improvements in the present invention will be discussed with reference to examples.

In order to further improve the $\beta$-silicon nitride sintered body, it is preferable that the $\beta$-silicon nitride sintered body has a porosity not more than 5%, the three-point flexural strength not less than 500 MPa, the Weibull modulus not less than 40, and the fracture toughness not less than 7 MPa$\sqrt{m}$. It will be understood that the porosity is the fraction as a percent of the total volume occupied by pores or voids in the sintered body. These preferable conditions of the $\beta$-silicon nitride are obtained by controlling the size, density and distribution of columnar crystal of several microns under selecting the kind and addition amount of the sintering assistant(s) and the firing condition, resulting in the $\beta$-silicon nitride sintered body which is excellent in strength and toughness, small in scattering of strength thereby to improve a reliability in strength of the sintered body.

According to the improvements upon the above preferable conditions, the kind and amount of the sintering assistant(s) to be added to the starting material is controlled in accordance with the $\beta$-silicon nitride powder used as the starting material, and then mixed with the $\beta$-silicon nitride powder to form a mixture. After compacted, the mixture is fired in such a condition as to uniform large grains in the compacted mixture, upon paying attention to the number and distribution of the large grains in the sintered body. This provides a high reliability in strength of the sintered body in addition to high strength and toughness, onto the β-silicon nitride sintered body.

More specifically, such a high reliability β-silicon nitride sintered body is produced by a method comprising the following steps in the sequence set forth: preparing powder of a starting material including α-silicon nitride and β-silicon nitride which is in an amount not less than 80% by weight of the starting material; adding at least one selected from the group consisting of oxides of elements of the group IIIa of the periodic table of elements, aluminum oxide, magnesium oxide, calcium oxide, zirconium oxide and aluminum nitride in an amount ranging from 0.2% to 10% by weight (as a sintering assistant) to the starting material powder to form a mixture powder; compacting the mixture powder to form a compact; firing the compact under a nitrogen gas pressure not higher than 500 atm. at a temperature ranging from 1600° to 2100° C. to form a fired compact; and conducting a heat treatment of the fired compact under a nitrogen gas pressure not lower than 2 atm. and at a temperature ranging from 1800° to 2100° C. thereby to achieve growth of grain in the fired compact. The thus obtained β-silicon nitride sintered body has a high reliability in addition to excellent strength and roughness. It will be understood that the β-silicon nitride sintered body includes fine grains and large grains and therefore serves as a kind of composite material thereby improving the strength and toughness, and is uniformed in size of the large grains thereby to exhibit the high reliability in strength of the sintered body.

As mentioned above, the thus produced β-silicon nitride sintered body has the porosity not more than 5%, the three-point flexural strength not less than 500 MPa, the Weibull modulus not less than 40, and the fracture toughness not less than 7 MPa√m.

It is known that some porous materials have a large Weibull modulus. However, such porous materials are low in strength owing to a high porosity and not suitable for structural materials. Accordingly, the above-mentioned porosity not more than 5% is determined. The β-silicon nitride sintered body having the three-point flexural strength less than 500 MPa is low in strength and not suitable for the structural material of engine parts or the like. Silicon nitride materials having a Weibull modulus less than 40 is known to have conventionally existed but low in the reliability. Additionally, the β-silicon nitride sintered body having the fracture toughness less than 7 MPa√m is not suitable for use as the structural material. Thus, it will be appreciated that the β-silicon nitride sintered body preferably has the porosity not more than 5%, the three-point flexural strength not less than 500 MPa, the Weibull modulus not less than 40, and the fracture toughness not less than 7 MPa√m.

The texture of such a β-silicon nitride sintered body will be discussed hereinafter.

The β-silicon nitride sintered body provided with the above preferable conditions has a matrix having a texture which is made up of matrix grains (main grains constituting the matrix) and large grains dispersed in the matrix to form a composite texture. The matrix grains are columnar β-silicon nitride grains having a mean particle diameter less than 3 μm. The large grains are columnar β-silicon nitride grains having a mean particle diameter between 3 μm and 10 μm. The mean particle diameter of the large grains is not less than two times of that of the matrix grains. The large grains have a length rainging between 10 μm and 150 μm.

In this regard, if the mean particle diameter of the matrix grains is not less than 3 μm, the sintered body is low in strength. If the mean particle diameter of the large grains is less than two times of that of the matrix grains, a toughening effect due to the large grain is insufficient so that the fracture toughness of the sintered body is low. If the mean particle diameter of the large grains is less than 3 μm, the toughening effect due to the large grain is insufficient thereby to lower the fracture toughness of the sintered body. If the mean particle diameter of the large grains exceeds 10 μm, an inside fracture of the large grain becomes remarkable and therefore the fracture toughness of the sintered body is lowered. If the large grains have the length less than 10 μm, toughening of the sintered body is insufficient thereby to lower the fracture toughness. If the large grains have the length exceeding 150 μm, the large grain plays a role as a defect thereby lowering the strength of the sintered body.

In order to increase the Weibull modulus, it is preferable to uniformly disperse the large grains in the matrix of the sintered body. In this case, it is preferable to disperse the large grains in such a manner that two or more large grains (serving as the defect) having the length not less than 30 μm and located close or contacting to each other within a distance not more than 10 μm occupy not more than 10% (by volume or weight) of total large grains having the length not less than 30 μm. If a plurality of such large grains having the length not less than 30 μm are close to each other to form a mass, this mass plays a role as the defect thereby lowering the strength of the sintered body. If the distance between such large grains close to each other is not more than 10 μm, a strength lowering of the sintered body becomes remarkable, and therefore it is preferable that such large grains are separate from each other by a distance of at least 10 μm. If the rate of such large grains close to each other exceeds 10% of the total large grains having the length not less than 30 μm, the scattering in strength of the sintered body is remarkable.

The number of the large grains per a unit volume affects the Weibull modulus. In order to increase the Weibull modulus, it is preferable to limit the number between upper and lower limited values. In this case, it is preferable to control the number of the large grains having the length not less than 30 μm is between 20 and 200 per 1 mm$^2$ when a fracture surface of the sintered body is observed. If the number of such large grains is less than 20 per 1 mm$^2$, the contribution of the large grains to the toughening effect is small so that the toughness of the sintered body is low. If the number exceeds 200 per 1 mm2, the content of large grains increases thereby to lower the Weibull modulus because the large grains having the length not less than 30 μm serve as the defect.

The number of the large grains are measured as follows: The sintered body is fractured in the same manner as in the bending test or the like thereby to form the fracture surface. The fracture surface is observed by the scanning electron microscope or the like, and then a photograph of the fracture surface is taken. On the photograph, the number of the large grains having the length not less than 30 μm within a predetermined area is counted.

Additionally, the volume of such large grains per a unit volume affects the Weibull modulus. In order to increase the Weibull modulus, it is preferable to limit the volume of the large grains between upper and lower limit values. In other words, if the large grains having the length not less than 30 μm occupy 1 to 15% by volume of the sintered body, the Weibull modulus of the sintered body is increased. If the rate of such large grains is less than 1% by volume of the sintered body, the contribution to the toughening effect of the large grains is small thereby lowering the toughness of the sintered body. If the rate of such large grains exceeds 15% by volume, the rate of the large grains having a length not less than 30 μm and serving as a fracture starting point increases thereby lowering the Weibull modulus of the sintered body.

The producing method of the further improved β-silicon nitride sintered body provided with the above-mentioned preferable conditions will be discussed.

The staring material is a silicon nitride powder including α-silicon nitride and β-silicon nitride which is in an amount not less than 80% by weight of the powder. In case of using b-silicon nitride as the starting material, columnar grains are developed in the sintered body owing to the grain growth of b-silicon nitride grains. By accomplishing a particle size control of silicon nitride powder, the starting material can have uniform size nuclei for grain growth. Upon firing such a powder under a suitable condition, it is possible to obtain the starting material containing uniform size large grains.

If α-silicon nitride is used as the starting material, first a phase transition of from α-phase to β-phase occurs during the firing step. At this step, b-silicon nitride grains of several microns are formed, so that grain growth thereafter occurs in accordance with the particle size distribution of the formed β-silicon nitride grains. The size of the β-silicon nitride grains formed under the phase transition is difficult to be controlled and has a large scattering, and therefore the size of the grown large grains of β-silicon nitride is scattered throughout a wide range. Accordingly, if β-silicon nitride is not less than 80% by volume of the starting material, the nuclei due to the phase transition are unavoidably formed thereby enlarging the scattering in strength of the sintering body.

Although the particle size of the starting material is not particularly specified, β-silicon nitride powder is generally coarse and therefore is required to be subjected to a pulverization and classification treatment, in which β-silicon nitride powder having a mean particle size not more than 1.0 μm is preferably used as the starting material. Additionally, controling the particle size distribution may be applied to the powder of the starting material in order to uniform the sizes of the nuclei for grain growth.

The sintering assistant(s) is added to the starting material to form a mixture of raw materials. In this case, the sintering assistant is at least one selected from the group consisting of oxides of elements (having atomic number of 21, 39, 57 to 71, and 89) of the group IIIa of the periodic table of elements, aluminum oxide, magnesium oxide, calcium oxide, zirconium oxide and aluminum nitride in an amount ranging from 0.2% to 10% by weight of the starting material. The kind and addition amount of the sintering assistant are selected within the above ranges and in accordance with purity of the starting material and application of a product. The sinterability is lowered, and the grain boundary becomes weak so as to lower the strength if the addition amount is less than 0.2% by weight.

In order to compact the raw material mixture, isostatic pressing, injection molding, casting or the like is employed. Firing of the thus formed compact is carried out in a nitrogen gas atmosphere under a nitrogen gas pressure not higher than 500 atm. and at a temperature ranging from 1600° to 2100° C. The necessary nitrogen gas pressure changes depending upon the firing temperature, in which the pressure of the nitrogen gas atmosphere increases as the firing temperature increases. The necessary lowest value of the nitrogen gas atmosphere pressure is 1 atm. in firing at a temperature ranging from 1600° C. to 1750° C., 2 atm. in firing at a temperature of 1800° C., 5 atm. in firing at a temperature of 1900° C., and 10 atm. in firing at a temperature of 2000° C. If the pressure of the atmosphere is lower than the above-mentioned predetermined necessary lowest value, silicon nitride makes its thermal decomposition releasing nitrogen so as to be converted to silicon. This is not desirable. If the pressure exceeds 500 atm., pores remain in the sintered body so that densification of the sintered body cannot be sufficiently made. After the firing, the sintered compact or body is subjected to a heat treatment under a nitrogen gas pressure not lower than 2 atm. and at a temperature ranging from 1800° C. to 2100° C. This heat treatment is continued until the large grains of β-silicon nitride grow to have the mean particle size ranging from 3 μm to 7 μm.

The firing and the heat treatment are usually carried out in the same step or in the same furnace in a continuous process for producing β-silicon nitride sintered body, in which the firing step is continuously followed by the heat treatment step upon controlling a firing schedule. It will be understood that the firing and heat treatment steps may be carried out respectively in separate steps or in separate furnaces. Additionally, the heat treatment step may not be employed in case that the firing is carried out in a condition in which firing and grain growth simultaneously proceed (or under a nitrogen gas pressure ranging from 2 atm. to 500 atm. and at a temperature ranging from 1800° C. to 2100° C. Additionally, the heat treatment for grain growth is carried out under the condition of a hot isostatic treatment.

If the firing temperature in the firing step is lower than 1600° C., densification of the sintered body cannot be sufficiently achieved. If the firing temperature exceeds 2100° C., grain growth becomes remarkable thereby lowering strength of the sintered body. If the temperature at the heat treatment step is lower than 1800° C., densification of the sintered body is possible; however, growth of the large grains is insufficient so as not to provide a texture in which fine and large grains are mixed. If the heat treatment temperature exceeds 2100° C., grain growth becomes remarkable thereby lowering strength of the sintered body.

Although the times of the firing and the heat treatment change depending respectively upon the temperatures of the firing and the heat treatments, the firing time is preferably a shortest time within which densification of the texture is achieved. The heat treatment time is determined taking account of size, density and distribution of the large grains, in which it is preferably within a range from 30 minutes to about 4 hours.

Thus, the grain growth of the large grains is accomplished by controlling the temperature and time in the firing step in the above-discussed manner. The heat treatment is made in such a manner that the large grains take the mean particle diameter ranging from 3 μm to 10 μm. If the mean particle diameter is less than 3 μm, columnar crystal development in the texture is insufficient thereby lowering toughness of the sintered body. If the mean particle diameter exceeds 10 μm, scattering in size of the large grains becomes large thereby lowering the reliability in strength of the sintered body.

In order to further improve the reliability in strength of the sintered body, the time and temperature in the heat treatment step is preferably controlled to obtain the following texture of the sintered body: The large grains are dispersed in such a manner that two or more large grains (serving as the defect) having the length not less than 30 μm and located close or contacting to each other within a distance not more than 10 μm occupy not more than 10% of total large grains having the length not less than 30 μm. The number of the large grains having the length not less than 30 μm is between 20 and 200 per 1 mm² when the fracture surface of the sintered body is observed. Additionally, the large grains having the length not less than 30 μm occupy 1 to 15% by volume of the sintered body.

Although the reason why the composite texture including the uniform large grains can be obtained by the above-discussed producing method is not apparent, it is guessed as follow: By using β-silicon nitride powder as the starting material, particles serving as nuclei for growth of the large grains are uniformly dispersed in accordance with the particle size distribution of the starting material. When grain growth starts from these nuclei, grain growth to large grains is suppressed in particles located close each other. Accordingly, the thus grown large grains having a uniform size are uniformly distributed throughout the texture of the sintered body, in which no strength lowering under combining of large grains occurs thereby raising the Weibull modulus of the sintered body.

Examples will be discussed to illustrate the further improved β-silicon nitride sintered body in detail.

EXAMPLE 2-1

To a silicon nitride powder having a mean particle diameter of 0.5 μm and a maximum particle diameter of 2 μm and including 95% by weight of β-silicon nitride, 0.8% by weight of yttrium oxide and 1.2% by weight of neodymium oxide were added as shown in Table 5 thereby forming a mixture. The mixture was then pulverized for 94 hours by using a wet ball mill to which ethanol was supplied. Thereafter, the mixture was dried in the air by using a spray dryer, and then compacted at a pressure of 20 MPa by using a metallic mold. The thus compacted mixture was further compacted by using a so-called rubber pressing or isostatic pressing under a pressure of 200 MPa thereby obtaining a compact having a dimension of 6 mm×6 mm×50 mm. This compact was fired in a gas pressure furnace formed of graphite, first in a condition of under a nitrogen gas pressure of 100 atm. at a temperature of 1900° C. for 2 hours, and thereafter in another condition of under a nitrogen gas pressure of 300 atm. at a temperature of 2000° C. for 2 hours thereby obtaining a sintered body of Example 2-1. The amount of β-silicon nitride in the sintered body was 100% as shown in Table 6.

The thus obtained sintered body was machined or ground to form flat surfaces by using a diamond wheel of 800 mesh thus obtaining a specimen having a dimension of 3 mm×4 mm×40 mm. The specimen was subjected to a three-point bending test (at room temperature) according to JIS R 1601 thereby to measure a flexural strength at room temperature. Additionally, the specimen was subjected to a SEPB test according to JIS R 1606 thereby to measure a fracture toughness. The SEPB test was conducted as follows: A so-called Vickers' indentation as used in a Vickers hardness test was formed on the surface having the dimension of 3 mm×40 mm, of the specimen. A previous crack was formed from this indentation, and then fracture of the specimen was made upon being originated from the previous crack. Additionally, the porosity and the Weibull modulus of the sintered body were also measured.

The results of the measurements are shown in Table 6, in which the sintered body had the porosity of 1.1%, the three-point flexural strength (at room temperature) of 689 MPa, the fracture toughness of 8.5 MPa$\sqrt{m}$, and the Weibull modulus of 53.

Furthermore, the fracture surface of the sintered body was observed by the scanning electron microscope. As a result, the mean particle diameter of the matrix of the sintered body was 1.5 μm as indicated in the column "A" in Table 6, the mean particle diameter of the large grains having a particle diameter not less than 3 μm was 3.5 μm as indicated in the column "B" in Table 6, and the mean length of the large grains having a particle size not less than 3 μm was 50 μm as indicated in the column "C" in Table 6. Additionally, at least two large grains having the length not less than 30 μm and located close or contacting to each other within a distance not more than 10 μm were in an amount of 3.0% of total large grains having the length not less than 30 μm as indicated in the column "D" in Table 6. The number of the large grains having the length not less than 30 μm was observed to be 68 per 1 mm² as indicated in the column "E" in Table 6. The volume percentage of the large grains having the length not less than 30 μm in the sintered body was 3.2% by volume as indicated in the column "F" in Table 6.

Thus, using β-silicon nitride powder as the starting material and controlling the size of the large grains of the β-phase columnar form can provide the high reliability β-silicon nitride sintered body which is large in the Weibull modulus and small in scattering in strength of the sintered body.

COMPARATIVE EXAMPLE 2-1

To a α-silicon nitride powder having a mean particle diameter of 0.6 μm and a maximum particle diameter of 2 μm and including 5% by weight of β-silicon nitride powder, 0.8% by weight of yttrium oxide and 1.2% by weight of neodymium oxide were added as shown in Table 7 thereby forming a mixture. The mixture was then pulverized for 94 hours by using a wet ball mill to which ethanol was supplied. Thereafter, the mixture was dried in the air by using a spray dryer, and then compacted at a pressure of 20 MPa by using a metallic mold. The thus compacted mixture was further compacted by using a so-called rubber pressing or isostatic pressing under a pressure of 200 MPa thereby obtaining a compact having a dimension of 6 mm×6 mm×50 mm.

The compact was fired under the same condition as that in Example 2-1 thereby obtaining a sintered body including β-phase in an amount of 93% by weight of the total silicon nitride. The thus obtained sintered body was subjected to machining in the same manner as that in Example 2-1 to form a specimen. The specimen was then subjected to measurements for getting the characteristics of the sintered body in the same manner as that in Example 2-1.

The results of the measurements are shown in Table 8, in which the sintered body has the porosity of 2%, the three-point flexural strength (at room temperature) of 740 MPa, the fracture toughness of 7.5 MPa$\sqrt{m}$, and the Weibull modulus of 18 so as to be large in scattering in strength of the sintered body.

Furthermore, the fracture surface of the sintered body was observed by the scanning electron microscope. As a result, the mean particle diameter of the matrix of the sintered body was 1.2 μm as indicated in the column "A" in Table 8, the mean particle diameter of the large grains having a particle diameter not less than 3 μm was 8.2 μm as indicated in the column "B" in Table 8, and the mean length of the large grains having a particle size not less than 3 μm was 180 μm as indicated in the column "C" in Table 8. Additionally, at least two large grains having the length not less than 30 μm and located close or contacting to each other within a distance not more than 10 μm are in an amount of 18% of total large grains having the length not less than 30 μm as indicated in the column "D" in Table 8. The number of the large grains having the length not less than 30 μm was observed to be 240 per 1 mm$^2$ as indicated in the column "E" in Table 8. The volume percentage of the large grains having the length not less than 30 μm to the sintered body was 18.6% by volume as indicated in the column "F" in Table 8.

Thus, using the α-silicon nitride powder as the starting material provides a silicon nitride sintered body which is small in Weibull modulus so that the scattering in strength of the sintered body is large.

EXAMPLES 2-2 to 2-8

To the same silicon nitride powder as that used in Example 2-1 (having a mean particle diameter of 0.5 μm and a maximum particle diameter of 2 μm and including 95% by weight of β-silicon nitride), the sintering assistant(s) having a composition shown in Table 5 was added thereby forming a mixture. The mixture was then mixed and pulverized for 94 hours by using a wet ball mill to which ethanol was supplied. Thereafter, the mixture was dried in the air by using a spray dryer, and then compacted at a pressure of 20 MPa by using a metallic mold. The thus compacted mixture was further compacted by using a so-called rubber pressing or isostatic pressing under a pressure of 200 MPa thereby obtaining a compact having a dimension of 6 mm×6 mm×50 mm. This compact was fired in a gas pressure furnace formed of graphite in a similar manner to that in Example 2-1 under a condition shown in the column of each of Examples 2-2 to 2-8 in Table 5 thereby obtaining each of sintered bodies of Examples 2-1 to 2-8. The amount of β-silicon nitride in each of the sintered bodies was not less than 95% by weight of the total silicon nitride as shown in Table 6.

The thus obtained sintered body was machined or ground to form flat surfaces by using a diamond wheel of 800 mesh thus obtaining a specimen having a dimension of 3 mm×4 mm×40 mm. The specimen was subjected to a three-point bending test (at room temperature) according to JIS R 1601 thereby to measure a flexural strength at room temperature. Additionally, the specimen was subjected to a SEPB test according to JIS R 1606 thereby to measure a fracture toughness. The SEPB test was conducted as follows: A so-called Vickers' indentation as used in a Vickers hardness test was formed on the surface having the dimension of 3 mm×40 mm, of the specimen. A previous crack was formed from this indentation, and then fracture of the specimen was made upon being originated from the previous crack. Additionally, the porosity and the Weibull modulus of the sintered body were also measured.

The results of the measurements are shown in Table 6, in which each sintered body had the porosity of not more than 5%, the three-point flexural strength (at room temperature) not less than 500 MPa, the fracture toughness not less than MPa$\sqrt{m}$, and the Weibull modulus not less than 40.

Furthermore, the fracture surface of each sintered body was observed by the scanning electron microscope. As a result, the mean particle diameter of the matrix of each sintered body was less than 3 μm as indicated in the column "A" in Table 6, the mean particle diameter of the large grains having a particle diameter not less than 3 μm was not less than 2 times of the mean particle diameter of the matrix grains and was within a range between 3 μm and 10 μm as indicated in the column "B" in Table 6, and the mean length of the large grains having a particle size not less than 3 μm was within a range between 10 μm and 150 μm as indicated in the column "C" in Table 6. Additionally, at least two large grains having the length not less than 30 μm and located close or contacting to each other within a distance not more than 10 μm are in an amount of not more than 10% of total large grains having the length not less than 30 μm as indicated in the column "D" in Table 6. The number of the large grains having the length not less than 30 μm was observed to be within a range between 20 and 200 per 1 mm$^2$ as indicated in the column "E" in Table 6. The volume percentage of the large grains having the length not less than 30 μm to the sintered body was within a range between 1% and 15% by volume as indicated in the column "F" in Table 6.

Thus, using β-silicon nitride powder as the starting material and controlling the size of the large grains of β-phase columnar crystal can provide the high reliability β-silicon nitride sintered body which is large in the Weibull modulus and small in scattering in strength of the sintered body.

COMPARATIVE EXAMPLES 2-2 to 2-6

To the same starting material silicon nitride powder as that in Example 2-1, the sintering assistant(s) having a composition shown in the column of Comparative Examples 2-2 to 2-6 in Table 7 was added thereby forming a mixture. The mixture was then mixed and pulverized for 94 hours by using a wet ball mill to which ethanol was supplied. Thereafter, the mixture was dried in the air by using a spray dryer, and then compacted at a pressure of 20 MPa by using a metallic mold. The thus compacted mixture was further compacted by using a so-called rubber pressing or isostatic pressing under a pressure of 200 MPa thereby obtaining a compact having a dimension of 6 mm×6 mm ×50 mm.

The compact was fired under a condition shown in the column of Comparative Example 2-2 to 2-6 thereby obtaining a sintered body of each of Comparative Examples 2-2 to 2-6. Each sintered body including β-phase not less than 96% by weight of the total silicon nitride. The thus obtained sintered body was subjected to machining in the same manner as that in Example 2-1 to form a specimen. The specimen was then subjected to measurements for getting the characteristics of the sintered body in the same manner as that in Example 2-1.

The results of the measurements are shown in Table 8. Additionally, the fracture surface of each sintered body was observed by the scanning electron microscope. As a result, the mean particle diameter of the matrix of the sintered body was a value indicated in the column "A" in Table 8, the mean particle diameter of the large grains having a particle diameter not less than 3 μm was a value indicated in the column "B" in Table 8, and the mean length of the large grains having a particle size not less than 3 μm was a value indicated in the column "C" in Table 8. Additionally, at least two large grains having the length not less than 30 μm and located close or contacting to each other within a distance not more than 10 μm are in an amount indicated in the column "D" in Table 8, of total large grains having the length not less than 30 μm. The number of the large grains having the length not less than 30 μm was observed to be a value indicated in the column "E" in Table 8. The volume percentage of the large grains having the length not less than 30 μm to the sintered body was within a value indicated in the column "F" in Table 8.

As seen from Table 8, all the sintered bodies of Comparative Examples 2-2 to 2-6 are small in Weibull modulus and large in scattering in strength of each sintered body, so that no sintering body high both in strength and reliability can be obtained according to the production methods of the Comparative examples.

Hereinafter, the powder of the starting material or β-silicon nitride raw material powder to be preferably used in present invention will be discussed.

The β-silicon nitride powder (starting material powder) discussed hereinafter is suitable for producing a high strength and high toughness β-silicon nitride sintered body. The β-silicon nitride powder is constituted of a mixture powder of a fine powder for improving a sinterability of the sintered body, and a coarse powder which is controlled in particle size, particle shape and particle size distribution and serves as nuclei for grain growth to control a texture of the sintered body. This β-silicon nitride powder can provide the high strength and high toughness β-sintered body which is not lower in quality than that provided by using a high purity α-type starting material. It will be understood the fine or coarse powder may be singly used as the starting material.

The β-silicon nitride powder of this instance is preferably the mixture powder of:

the fine powder or β-silicon nitride powder in an amount ranging from 80 to 98% by weight, including α-silicon nitride and β-silicon nitride which is in an amount not less than 95% by weight (i.e., including less than 5% by weight of α-type silicon nitride) of the fine powder, the silicon nitride powder containing particles having a particle diameter not larger than 0.7 μm, in an amount not less than 90% by weight of total particles, the silicon nitride powder having a means particle diameter not larger than 0.5 μm; and the coarse powder or β-silicon nitride powder in an amount ranging from 2 to 20% by weight, including α-silicon nitride powder and β-silicon nitride powder which is in an amount not less than 95% by weight (i.e., including less than 5% by weight of α-type silicon nitride) of the coarse powder, the silicon nitride powder containing particles having an aspect ratio ranging from 2 to 10 and a shorter axis diameter ranging from 0.5 to 5 μm, in an amount not less than 70% by weight of total of the silicon nitride powder.

The above fine and coarse powders are produced in manners as set forth below.

The fine powder is produced by applying a pulverization and classification treatment onto the silicon nitride powder including α-silicon nitride and β-silicon nitride which is in an amount not less than 95% by weight, in a manner that the silicon nitride powder contains particles having a particle diameter not larger than 0.7 μm, in an amount not less than 90% by weight of total particles.

The coarse powder is produced by applying a treatment onto a silicon nitride powder including α-silicon nitride, β-silicon nitride and/or amorphous silicon nitride, in order that the silicon nitride powder includes β-silicon nitride in an amount not less than 95% by weight and that the silicon nitride powder containing particles having an aspect ratio ranging from 2 to 10 and a (shorter axis) diameter ranging from 0.5 to 5 μm, in an amount not less than 70% by weight of total of the silicon nitride powder, the treatment including the steps of adding to the silicon nitride powder at least one selected from the group consisting of CaO, MgO, Al2O3 and oxides of elements of the group IIIa of the periodic table of elements, in an amount ranging from 0.2 to 10% by weight, and heating the silicon nitride powder at a temperature ranging from 1500° to 1900° C.

Upon using the above mixture powder of the fine and coarse powders, a method of producing the β-silicon nitride sintered body comprises the following steps in sequence set forth: preparing the above-mentioned mixture powder of the fine and coarse powders; adding to the mixture powder at least one selected from the group consisting of CaO, MgO, Al2O3 and oxides of elements of the group IIIa of the periodic table of elements, in an amount ranging from 0.2 to 15% by weight; compacting the mixture powder to form a compact; and firing the compact at a temperature ranging from 1600° to 2100° C. thereby to obtain the β-silicon nitride sintered body having columnar grains each of which has a (shorter axis) diameter not less than 3 μm, in an amount not less than 5% by volume of the sintered body.

The above starting material (β-silicon nitride powder) for producing the β-silicon nitride sintered body will be discussed further in detail.

Fine powder

The β-silicon nitride powder containing not less than 95% by weight of β-silicon nitride is used as the raw material powder fog producing the fine powder. If the β-silicon nitride is less than 95%, the phase transition of α-phase to β-phase occurs so that no texture control is impossible during firing. This raw material powder may be a low purity powder for refractory products or a high purity powder for high performance products. The raw material powder is increased in content of particles having a particle diameter not larger than 0.7 μm under a pulverization treatment. Although pulverization methods for the raw material powder are not particularly specified, pulverization using a wet ball mill or an attrition mill is industrially preferable. In case the content of the particles having not larger than 0.7 μm cannot be increased over a level not less than 90% by weight only under the pulverization treatment, a classification treatment is also applied to the pulverized raw material. Although classification methods are not particularly specified, classification employing a sedimentation method, a centrifugal sedimentation method or a dry classification method is preferable. Thus, the β-silicon nitride powder can contain not less than 90% by weight of particles having a particle diameter not larger than 0.7 μm. If the content of particles having a particle diameter larger than 0.7 μm increases over 10% by weight, the sinterability of the powder is lowered while nuclei for grain growth are increased thereby obstructing a texture control of the sintered body.

Coarse powder

α-silicon nitride powder, β-silicon nitride powder and/or amorphous silicon nitride powder is used for the raw material for producing the coarse powder. To this powder, at least one selected from the group consisting of CaO, MgO, Al$_2$O$_3$ and oxides of elements of the group IIIa of the periodic table of elements is added in an amount ranging from 0.2 to 10% by weight of the silicon nitride powder as a grain growth promoting assistant. This grain growth promoting assistant forms a liquid phase during heating thereby promoting the phase transition from α-phase to β-phase thereby producing columnar β-phase grains which are high in the aspect ratio. The condition of this heating changes depending upon the composition and amount of the assistant, in which the heating is made preferably at a temperature ranging from 1500° to 1900° C. and more preferably at a temperature ranging from 1700° to 1900° C. In this case, the phase transition cannot occur at the heating temperature lower than 1500° C. whereas thermal decomposition occurs at the heating temperature over 1900° C., so that it is difficult to obtain particles high in the aspect ratio. It is preferable that the addition amount of the assistant is from 0.2 to 10% by weight. In this regard, a phase transition promotion effect is low at the assistant addition amount less than 0.2% by weight whereas the aspect ratio is small at the addition amount exceeding 10% by weight. Thus, the above production method can provide the coarse β-silicon nitride powder containing β-silicon nitride which is in an amount not less than 95% by weight, and containing particles having an aspect ratio ranging from 2 to 10 and a (shorter axis) diameter ranging from 0.5 to 5 μm, in an amount not less than 70% by weight of total of said silicon nitride powder. If the content of the β-silicon nitride in the coarse powder is less than 95% by weight, it is difficult to achieve a texture control. Concerning the aspect ratio, the particles cannot effectively serve as nuclei for grain growth during the texture control if it is less than 2, while the power is difficult to be compacted if it exceeds 10. Concerning the (shorter axis) diameter, a contribution to toughening the sintered body is small if it is less than 0.5 μm, while a defect tends to be readily formed thereby lowering the strength of that sintered body if it exceeds 5 μm.

Mixture powder

The mixture powder is prepared by mixing the fine powder in an amount ranging from 80 to 98% by weight and the coarse powder in an amount ranging from 2 to 20% by weight. The coarse powder is added for the purpose of controlling the texture of the sintered body. In this case, if the addition amount of the coarse powder is less than 2% by weight, they are low in effect as nuclei for grain growth. If the addition amount exceeds 20% by weight, the sinterability of the mixture powder is low.

Production of sintered body

To the above mixture powder, at least one selected from the group consisting of CaO, MgO, Al2O3 and oxides of elements of the group IIIa of the periodic table of elements is added in an amount ranging 0.2 to 15% by weight of the mixture powder as the grain growth promoting or sintering assistant. The addition amount of the assistant includes an amount of oxide (serving as the grain growth promoting assistant) which has been contained in the mixture powder. If the addition amount of this assistant is less than 0.2% by weight, the effect of promoting densification of the sintered body is low. If the addition amount of the assistant exceeds 15% by weight, the sintered body is low in strength.

The compact of the mixture powder is fired at a temperature ranging from 1600° to 2100° C. If the firing temperature is lower than 1600° C., the degree of densification of the sintered body is low. If the firing temperature exceeds 2100° C., the sintered body is low in strength. This firing is continued until the sintered body reaches its condition in which columnar grains having a (shorter axis) diameter not less than 3 μm is contained in an amount not less than 5% by volume of the sintered body. If the (shorter axis) diameter of the columnar grains is less than 3 μm, the degree of toughening the sintered body is low. If the amount of the columnar grains is less than 5% by volume, the degree of toughening of the sintered body is made less.

The firing is made in the atmosphere of nitrogen gas. The nitrogen gas atmosphere is necessary to prevent a thermal decomposition of silicon nitride, in which the pressure of the nitrogen gas atmosphere is raised as the firing temperature is raised. A necessary lowest value of the nitrogen gas atmosphere pressure is 1 atm. in firing at a temperature ranging from 1600° C. and 1750° C., 2 atm. in firing at 1800° C., 5 atm. in firing at a temperature of 1900° C., and 10 atm. in firing at a temperature of 2000° C. If the pressure of the atmosphere is lower than the above-mentioned necessary lowest value, silicon nitride makes its thermal decomposition releasing nitrogen so as to be converted to silicon. This is not desirable. Sintering the compact is accomplished by using a hot press, an ordinary pressure sintering method or a gas pressure sintering method, taking account of the shape of a product and/or the kind and amount of the sintering assistant(s) to be used.

As discussed above, the β-silicon nitride sintered body high in strength and fracture toughness can be obtained even upon using inexpensive β-silicon nitride powder as the starting material, by virtue of the fact that the β-silicon nitride powder stating material is the mixture powder of the fine powder for improving the sinterability and the coarse powder which is controlled in particle size, particle shape and particle size distribution and serve as nuclei for grain growth contributing to accomplish a texture control.

The following examples are exemplary of the production methods of the sintered bodies upon using the above mixture powder.

EXAMPLES 3-1 to 3-5

To a β-silicon nitride powder having a mean particle diameter of 2.5 μm and a maximum particle diameter of 20 μm and containing 99% by weight of β-silicon nitride powder, water and beads of a silicon nitride sintered body were added to form a mixture powder. The mixture powder was continuously pulverized by using an attrition mill thereby to form a slurry. The slurry was supplied into a water tank, upon which coarse particles were taken from the lower part of the water tank while fine particles were taken from the upper part of the same thereby accomplishing such a particle size control that the fine particles having a particle diameter not larger than 0.7 μm occupied 95% by weight of total particles.

At this time, macro particles having a particle diameter exceeding 10 μm was removed, and remaining particles having a particle diameter ranging from 0.7 to 10 μm were recovered and were again supplied into the mill together with the raw materials. Thus, the fine powder containing 95% by weight of β-silicon nitride and particles having a particle diameter not larger than 0.7 μm in an amount not less than 90% by weight of total particles were obtained.

On the other hand, 5% by weight of yttrium oxide ($Y_2O_3$) was added to a α-silicon nitride powder containing α-silicon nitride particles having a mean particle diameter of 0.5 μm to form a mixture. The mixture was mixed in a wet manner by using ethanol, and then dried. The dried mixture was heated in the atmosphere of nitrogen gas at 1 atm. at 1700° C. for 30 min. Subsequently, the powder after the heating treatment was pulverized for 2 hours by using a dry ball mill thereby obtaining a coarse powder containing 99% by volume of β-silicon nitride and particles having an aspect ratio of 7 and a (shorter axis) diameter of 3.5 μm, in an amount of 90% by weight of the total coarse powder.

Subsequently, the above-mentioned fine and the coarse powders were blended in a blended ratio or rate shown in the column of each of Examples 3-1 to 3-5 in Table 9. A sintering assistant(s) having a composition shown in the column of each of Examples 3-1 to 3-5 in Table 9 was added to the mixture of the fine and coarse powders and mixed with the mixture for 2 hours by using a ball mill thereby forming a mixture powder. Then, the mixture powder was dried in the air by using a spray dryer, and thereafter compacted at a pressure of 20 MPa by using a metallic mold. Thereafter, the thus compacted powder was further compacted by using a so-called rubber pressing or isostatic pressing under a pressure of 200 MPa thereby obtaining a compact having a dimension of 6 mm×6 mm×50 mm. This compact was fired under a firing condition shown in the column of each of Examples 3-1 to 3-5 thereby obtaining each sintered body of Examples 3-1 to 3-5.

Thereafter, the bulk density of each sintered body of Examples 3-1 to 3-5 was measured according to a so-called Archemedes' method using water, calculating a porosity of the sintered body. Further, each sintered body was machined or ground to form flat surfaces by using a diamond wheel of 800 mesh thus obtaining a specimen having a dimension of 3 mm×4 mm ×40 mm. The specimen was subjected to a three-point bending test (at room temperature) according to JIS R 1601 thereby to measure a flexural strength at room temperature. Additionally, the specimen was subjected to a SEPB test according to JIS R 1606 thereby to measure a fracture toughness. The SEPB test was conducted as follows: A so-called Vickers' indentation as used in a Vickers hardness test was formed on the surface having the dimension of 3 mm×40 mm, of the specimen. A previous crack was formed from this indentation, and then fracture of the specimen was made upon being originated from the previous crack. The results of the measurements of the sintered bodies are shown in the columns of Examples 3-1 of 3-5 in Table 9.

As seen from the results of Table 9, it was been confirmed that a high strength and high toughness β-silicon nitride sintered body could be obtained under any producing conditions of Examples 3-1 to 3-5.

COMPARATIVE EXAMPLES 3-1 to 3-3

The fine powder as same as that used in Examples 3-1 to 3-3 and the coarse power as same as that used in Examples 1 to 5 were blended in a blended ratio or rate respectively shown in the column of each of Comparative examples of 3-1 to 3-3 in Table 10. A sintering assistant(s) having a composition shown in the column of each of Comparative example 3-1 to 3-3 in Table 10 was added to the mixture of the fine and coarse powders and mixed with each other for 2 hours by using a ball mill thereby forming a mixture powder. Then, the mixture powder was dried in the air by using a spray dryer, and thereafter compacted at a pressure of 20 MPa by using a metallic mold. Thereafter, the thus compacted powder was further compacted by using a so-called rubber pressing or isostatic pressing under a pressure of 200 MPa thereby obtaining a compact having a dimension of 6 mm×6 mm×50 mm. This compact was fired under a firing condition shown in the column of each of Comparative examples 3-1 to 3-3 thereby obtaining each sintered body of Comparative examples 3-1 to 3-3.

Thereafter, the bulk density of each sintered body of Comparative examples 3-1 to 3-3 was measured according to a so-called Archemedes' method using water, calculating a porosity of the sintered body. Further, each sintered body was machined or ground to form flat surfaces by using a diamond wheel of 800 mesh thus obtaining a specimen having a dimension of 3 mm×4 mm×40 mm. The specimen was subjected to a three-point bending test (at room temperature) according to JIS R 1601 thereby to measure a flexural strength at room temperature. Additionally, the specimen was subjected to a SEPB test according to JIS R 1606 thereby to measure a fracture toughness. The SEPB test was conducted as follows: A so-called Vickers' indentation as used in a Vickers hardness test was formed on the surface having the dimension of 3 mm×40 mm, of the specimen. A previous crack was formed from this indentation, and then fracture of the specimen was made upon being originated from the previous crack. The results of the measurements of the sintered bodies are shown in the columns of Comparative examples 3-1 of 3-3 in Table 10.

As seen from the results of Table 10, the following facts were confirmed: In case the blended amount of the coarse powder was not more than 2% by weight as in Comparative example 3-1, the resultant sintered body was low in both strength and toughness. In case that blended amount of the coarse powder exceeded 20% by weight as in Comparative example 3-3, densification of the sintered body was obstructed thereby to lower the strength of the sintered body. In case the firing temperature was too high as in Comparative example 3-2, the resultant sintered body was lowered in strength.

EXAMPLES 3-11 to 3-13

To a β-silicon nitride powder having a mean particle diameter of 10 μm and a maximum particle diameter of 200 μm and containing 90% by weight of β-silicon nitride powder, water and beads of a silicon nitride sintered body were added to form a mixture powder.

The mixture powder was pulverized for 200 hours by using a ball mill and dried. Thereafter, the mixture powder was subjected to a pulverization and classification by using a jet pulverizer and a dry classifier thereby obtaining a fine powder having a particle size or diameter shown in Table 11, in which three kinds of particle sizes were obtained by changing conditions of the pulverization and classification. The particle size in Table 11 is indicated as a particle diameter (μm) corresponding to a cumulative 90% by weight from the side of fine powder in a particle size distribution as shown in FIG. 1.

Subsequently, to the above-mentioned fine powder, 10% by weight of the coarse powder as same as that used in Examples 3-1 to 3-5 and a sintering assistant of 6% by weight of $Y_2O_3$ and 3% by weight of $Al_2O_3$ were added to form a mixture powder. The mixture powder was mixed for 2 hours by using a ball mill thereby forming a mixture powder. Then, the mixture powder was dried in the air by using a spray dryer, and thereafter compacted at a pressure of 20 MPa by using a metallic mold. Thereafter, the thus compacted powder was further compacted by using a so-called rubber pressing or isostatic pressing under a pressure of 200 MPa thereby obtaining a compact having a dimension of 6 mm ×6 mm×50 mm. This compact was fired under a nitrogen gas pressure of 10 atm. at 1800° C. for 4 hours thereby obtaining each sintered body of Examples 3-11 to 3-13.

Thereafter, the bulk density of each sintered body of Examples 3-11 to 3-13 was measured according to a so-called Archemedes' method using water, calculating the porosity of the sintered body. Further, each sintered body was machined or ground to form flat surfaces by using a diamond wheel of 800 mesh thus obtaining a specimen having a dimension of 3 mm×4 mm×40 mm. The specimen was subjected to a three-point bending test (at room temperature) according to JIS R 1601 thereby to measure a flexural strength at room temperature. Additionally, the specimen was subjected to a SEPB test according to JIS R 1606 thereby to measure a fracture toughness. The SEPB test was conducted as follows: A so-called Vickers' indentation as used in a Vickers hardness test was formed on the surface having the dimension of 3 mm×40 mm, of the specimen. A previous crack was formed from this indentation, and then fracture of the specimen was made upon being originated from the previous crack. The results of the measurements of the sintered bodies are shown in the columns of Examples 3-11 of 3-13 in Table 11.

As seen from the results of Table 11, it was confirmed that a high strength and high toughness β-silicon nitride sintered body could be obtained by using the mixture of fine and coarse β-silicon nitride powder.

COMPARATIVE EXAMPLES 3-11 and 3-12

Fine powders of Comparative exmaples 3-11 and 3-12 shown in Table 12 were obtained by making the same powder preparation operation as in Examples 3-11 to 3-13, in which two kinds of particle sizes were obtained by changing the conditions of the pulverization and classification. Also in this case, the particle size in Table 12 is indicated as a particle diameter (μm) corresponding to a cumulative 90% by weight from the side of fine powder in a particle size distribution as shown in FIG. 1.

Subsequently, to the above-mentioned fine powder, the coarse powder as same as that used in Examples 3-1 and 3-2 respectively and the sintering assistant as same as that used in Examples 3-11 to 3-13 were added to form a mixture powder. The thus obtained mixture powder was compacted and fired in the same manner as that in Examples 3-11 and 3-13, thereby obtaining a sintered body of each of Comparative examples 3-11 and 3-12.

The characteristics of the sintered body of Comparative examples 3-11 and 3-12 was examined to obtain the results shown in Table 12. From these results, it was confirmed that the sintered body was inferior in strength and toughness in case that a relatively coarse β-silicon nitride powder (containing particle having a particle size not larger than 0.7 μm in an amount not more than 90% by weight of total particles) was used as the fine powder.

EXAMPLES 3-21 to 3-23

To a α-silicon nitride powder having a mean particle diameter of 1.3 μm and containing 90% by weight of α-silicon nitride powder, oxides shown in Table 13 were added to form a mixture powder. The mixture powder was mixed in a wet manner using ethanol and then dried. The dried mixture powder was heated under a heating condition shown in Table 13. The thus obtained mixture powder upon the heating treatment was pulverized for 2 hours by using a dry ball mill thereby obtaining a coarse powder having a characteristics shown in Table 13.

Subsequently, to the fine powder as same as that used in Examples 3-1 to 3-5, the above-mentioned coarse powder as shown in Table 13 and a sintering assistant(s) of 6% by weight of $Y_2O_3$ and 3% by weight of $Al_2O_3$ were added to form a mixture powder. The mixture powder was mixed for 2 hours by using a ball mill thereby forming a mixture powder. Then, the mixture powder was dried in the air by using a spray dryer, and thereafter compacted at a pressure of 20 MPa by using a metallic mold. Thereafter, the thus compacted powder was further compacted by using a so-called rubber pressing or isostatic pressing under a pressure of 200 MPa thereby obtaining a compact having a dimension of 6 mm×6 mm×50 mm. This compact was fired under a nitrogen gas pressure of 10 atm. at 1800° C. for 4 hours thereby obtaining each sintered body of Examples 3-21 to 3-23.

Thereafter, the bulk density of each sintered body of Examples 3-21 to 3-23 was measured according to a so-called Archemedes' method using water, calculating a porosity of the sintered body. Further, each sintered body was machined or ground to form flat surfaces by using a diamond wheel of 800 mesh thus obtaining a specimen having a dimension of 3 mm×4 mm ×40 mm. The specimen was subjected to a three-point bending test (at room temperature) according to JIS R 1601 thereby to measure a flexural strength at room temperature. Additionally, the specimen was subjected to a SEPB test according to JIS R 1606 thereby to measure a fracture toughness. The SEPB test was conducted as follows: A so-called Vickers' indentation as used in a Vickers hardness test was formed on the surface having the dimension of 3 mm×40 mm, of the specimen. A previous crack was formed from this indentation, and then fracture of the specimen was made upon being originated from the previous crack. The results of the measurements of the sintered bodies are shown in the columns of Examples 3-21 of 3-23 in Table 13.

As apparent from the results of Table 13, it was confirmed that a high strength and high toughness β-silicon nitride sintered body could be obtained by using the coarse powder contains particles having the aspect ratio ranging from 2 to 10 and the shorter axis diameter ranging 0.5 to 5 μm, in an amount not less than 70% by weight of total coarse powder.

COMPARATIVE EXAMPLES 3-21 to 3-23

To a α-silicon nitride powder having a mean particle diameter of 1.3 μm and containing 90% by weight of α-silicon nitride powder, oxides shown in Table 14 were added to form a mixture powder. The mixture powder was mixed in a wet manner using ethanol and dried. The dried mixture powder was heated under a heating condition shown in Table 14. The thus obtained mixture powder upon the heating treatment was pulverized for 2 hours by using a dry ball mill thereby obtaining a coarse powder having a characteristics shown in Table 14.

Subsequently, to the fine powder as same as that used in Examples 3-1 to 3-5, the above-mentioned coarse powder as shown in Table 14 and a sintering assistant(s) of 6% by weight of $Y_2O_3$ and 3% by weight of $Al_2O_3$ were added to form a mixture powder. The mixture powder was mixed for 2 hours by using a ball mill thereby forming a mixture powder. Then, the mixture powder was dried in the air by using a spray dryer, and thereafter compacted at a pressure of 20 MPa by using a metallic mold. Thereafter, the thus compacted powder was further compacted by using a so-called rubber pressing or isostatic pressing under a pressure of 200 MPa thereby obtaining a compact having a dimension of 6 mm×6 mm×50 mm. This compact was fired under thereby obtaining each sintered body of Comparative examples 3-21 to 3-23.

Thereafter, the bulk density of each sintered body of Comparative examples 3-21 to 3-23 was measured according to a so-called Archemedes' method using water, calculating a porosity of the sintered body. Further, each sintered body was machined or ground to form flat surfaces by using a diamond wheel of 800 mesh thus obtaining a specimen having a dimension of 3 mm×4 mm×40 mm. The specimen was subjected to a three-point bending test (at room temperature) according to JIS R 1601 thereby to measure a flexural strength at room temperature. Additionally, the specimen was subjected to a SEPB test according to JIS R 1606 thereby to measure a fracture toughness. The SEPB test was conducted as follows: A so-called Vickers' indentation as used in a Vickers hardness test was formed on the surface having the dimension of 3 mm×40 mm, of the specimen. A previous crack was formed from this indentation, and then fracture of the specimen was made upon being originated from the previous crack. The results of the measurements of the sintered bodies are shown in the columns of Comparative examples 3-21 of 3-23 in Table 14.

As apparent from the results of Table 14, it was confirmed that a silicon nitride sintered body inferior in strength and toughness was obtained in case of using the coarse powder which was outside the condition of containing particles having the aspect ratio ranging from 2 to 10 and the shorter axis diameter ranging 0.5 to 5 μm, in an amount not less than 70% by weight of total coarse powder.

TABLE 1

| | | | FIRING CONDITION | | |
| SAMPLE | POWDER | SINTERING ASSISTANT (wt %) | TEMP. (°C.) | TIME (Hr.) | $N_2$ GAS PRESSURE (atm.) |
| --- | --- | --- | --- | --- | --- |
| EXAMPLE 1-1 | A | 0.8% $Y_2O_3$—1.2% $Nd_2O_3$ | 1900 | 4 | 100 |
| EXAMPLE 1-2 | B | 5% $Y_2O_3$ | 2000 | 2 | 100 |
| EXAMPLE 1-3 | B | 1% $La_2O_3$ | 1750 | 4 | 1 |
| EXAMPLE 1-4 | B | 2% $CeO_2$—2% $Yb_2O_3$ | 1800 | 6 | 10 |
| EXAMPLE 1-5 | B | 0.2% $Sm_2O_3$—0.2% $Nd_2O_3$ | 1950 | 2 | 10 |
| EXAMPLE 1-6 | B | 0.5% $Ho_2O_3$ | 1900 | 2 | 50 |
| EXAMPLE 1-7 | B | 3% $Dy_2O_3$ | 1850 | 1 | 50 | a nitrogen gas pressure of 10 atm. at 1800° C. for 4 hours

TABLE 2

| SAMPLE | BULK DENSITY/ THEORET. DENSITY (%) | CONTENT (wt %) OF β-SILICON NITRIDE IN TOTAL SILICON NITRIDE | AMOUNT (vol %) OF COLUMNAR GRAIN HAVING (SHORTER AXIS) DIAMETER NOT LESS THAN 5 μm AND ASPECT RATIO NOT LESS THAN 5 | TOTAL OXYGEN CONTENT IN SINTERED BODY (wt %) |
| --- | --- | --- | --- | --- |
| EXAMPLE 1-1 | 99 | 100 | 3 | 0.9 |
| EXAMPLE 1-2 | 98 | 100 | 5 | 2.4 |
| EXAMPLE 1-3 | 97 | 96 | 1 | 0.7 |
| EXAMPLE 1-4 | 99 | 98 | 2 | 2.2 |
| EXAMPLE 1-5 | 98 | 99 | 6 | 0.6 |
| EXAMPLE 1-6 | 96 | 100 | 7 | 0.7 |
| EXAMPLE 1-7 | 99 | 100 | 4 | 2.1 |

| SAMPLE | STRENGTH AT ROOM TEMP. (MPa) | WEIBULL MODULUS | FRACTURE TOUGHNESS (MPa $\sqrt{m}$) | VOID DEFECT |
| --- | --- | --- | --- | --- |
| EXAMPLE 1-1 | 780 | 30 | 7.7 | NIL |
| EXAMPLE 1-2 | 730 | 24 | 7.5 | NIL |
| EXAMPLE 1-3 | 620 | 20 | 6.0 | NIL |
| EXAMPLE 1-4 | 680 | 22 | 7.3 | NIL |
| EXAMPLE 1-5 | 720 | 25 | 6.4 | NIL |
| EXAMPLE 1-6 | 640 | 22 | 4.9 | NIL |

TABLE 2-continued

| | | | | |
|---|---|---|---|---|
| EXAMPLE 1-7 | 660 | 28 | 7.1 | NIL |

TABLE 3

| SAMPLE | POWDER | SINTERING ASSISTANT (wt %) | FIRING CONDITION TEMP. (°C.) | TIME (Hr.) | $N_2$ GAS PRESSURE (atm.) |
|---|---|---|---|---|---|
| COMPARATIVE EXAMPLE 1-1 | A | 7.3% $Y_2O_3$—10.9% $Nd_2O_3$ | 1900 | 4 | 100 |
| COMPARATIVE EXAMPLE 1-2 | B | 1% $Al_2O_3$ | 1900 | 2 | 10 |
| COMPARATIVE EXAMPLE 1-3 | C | 6% $Y_2O_3$—6% $Al_2O_3$ | 1650 | 2 | 10 |
| COMPARATIVE EXAMPLE 1-4 | B | 5% $Y_2O_3$ | 2200 | 1 | 500 |
| COMPARATIVE EXAMPLE 1-5 | B | 6% $Y_2O_3$—6% $Al_2O_3$ | 1900 | 4 | 10 |
| COMPARATIVE EXAMPLE 1-6 | D | 0.8% $Y_2O_3$—1.2% $Nd_2O_3$ | 1900 | 4 | 100 |

TABLE 4

| SAMPLE | BULK DENSITY/ THEORET. DENSITY (%) | CONTENT (wt %) OF β-SILICON NITRIDE IN TOTAL SILICON NITRIDE | AMOUNT (vol %) OF COLUMNAR GRAIN HAVING (SHORTER AXIS) DIAMETER NOT LESS THAN 5 μm AND ASPECT RATIO NOT LESS THAN 5 | TOTAL OXYGEN CONTENT IN SINTERED BODY (wt %) |
|---|---|---|---|---|
| COMPARATIVE EXAMPLE 1-1 | 90 | 100 | 5 | 4.5 |
| COMPARATIVE EXAMPLE 1-2 | 72 | 99 | 0 | 0.9 |
| COMPARATIVE EXAMPLE 1-3 | 92 | 90 | 0 | 4.2 |
| COMPARATIVE EXAMPLE 1-4 | 88 | 100 | 5 | 1.9 |
| COMPARATIVE EXAMPLE 1-5 | 93 | 100 | 4 | 4.0 |
| COMPARATIVE EXAMPLE 1-6 | 85 | 100 | 0 | 0.9 |

| SAMPLE | STRENGTH AT ROOM TEMP. (MPa) | WEIBULL MODULUS | FRACTURE TOUGHNESS (MPa $\sqrt{m}$) | VOID DEFECT |
|---|---|---|---|---|
| COMPARATIVE EXAMPLE 1-1 | 450 | 8 | 6.4 | EXIST |
| COMPARATIVE EXAMPLE 1-2 | 240 | 12 | 3.2 | NIL |
| COMPARATIVE EXAMPLE 1-3 | 380 | 13 | 2.5 | EXIST |
| COMPARATIVE EXAMPLE 1-4 | 430 | 15 | 6.6 | NIL |
| COMPARATIVE EXAMPLE 1-5 | 350 | 10 | 5.5 | EXIST |
| COMPARATIVE EXAMPLE 1-6 | 850 | 15 | 6.0 | NIL |

TABLE 5

| SAMPLE | SINTERING ASSISTANT (wt %) | FIRING CONDITION ($N_2$ GAS ATMOSPHERE) |
|---|---|---|
| EXAMPLE 2-1 | 0.8% $Y_2O_3$ 1.2% $Nd_2O_3$ | 1900° C.-100 atm.-2 hr. 2000° C.-300 atm.-2 hr. |
| EXAMPLE 2-2 | 2% $Y_2O_3$ | 1900° C.-10 atm.-2 hr. 2000° C.-50 atm.-30 min. |
| EXAMPLE 2-3 | 6% $Y_2O_3$ 3% $Al_2O_3$ | 1800° C.-5 atm.-1 hr. 1900° C.-5 atm.-1 hr. |
| EXAMPLE 2-4 | 2% $La_2O_3$ 2% $CeO_2$ | 1850° C.-5 atm.-30 min. 2050° C.-100 atm.-30 min. |
| EXAMPLE 2-5 | 1% $Y_2O_3$ 1% MgO 1% $Al_2O_3$ | 1850° C.-10 atm.-2 hr. |
| EXAMPLE 2-6 | 0.5% $Nd_2O_3$ | 1950° C.-100 atm.-2 hr. 2050° c.-200 atm.-30 min. |
| EXAMPLE 2-7 | 4% $Y_2O_3$ 2% $ZrO_2$ 2% $Al_2O_3$ | 1800° C.-10 atm.-2 hr. 1950° C.-50 atm.-2 hr. |
| EXAMPLE 2-8 | 1.2% $Nd_2O_3$ 0.8% $Y_2O_3$ | 1900° C.-5 atm.-2 hr. 2100° C.-50 atm.-30 min. |

TABLE 6

| SAMPLE | $\frac{\beta}{\alpha+\beta}$ (wt %) | POROSITY (%) | THREE-POINT FLEXURAL STRENGTH AT ROOM TEMP. (MPa) | FRACTURE TOUGHNESS (MPa $\sqrt{m}$) | WEIBULL MODULUS |
|---|---|---|---|---|---|
| EXAMPLE 2-1 | 100 | 1.1 | 689 | 8.5 | 53 |
| EXAMPLE 2-2 | 100 | 1.8 | 650 | 7.5 | 45 |
| EXAMPLE 2-3 | 98 | 0.5 | 740 | 7.2 | 43 |
| EXAMPLE 2-4 | 100 | 2.8 | 620 | 8.3 | 48 |
| EXAMPLE 2-5 | 99 | 2.2 | 820 | 7.8 | 42 |
| EXAMPLE 2-6 | 100 | 1.6 | 640 | 7.5 | 46 |
| EXAMPLE 2-7 | 100 | 3.5 | 550 | 7.2 | 44 |
| EXAMPLE 2-8 | 100 | 0.5 | 590 | 9.3 | 55 |

| SAMPLE | MICRO STRUCTURE OF SINTERED BODY | | | | | |
|---|---|---|---|---|---|---|
| | A (μm) | B (μm) | C (μm) | D (%) | E (NUMBER/mm$^2$) | F (%) |
| EXAMPLE 2-1 | 1.5 | 3.5 | 50 | 3.0 | 68 | 3.2 |
| EXAMPLE 2-2 | 1.6 | 3.8 | 65 | 5.2 | 78 | 5.3 |
| EXAMPLE 2-3 | 1.8 | 6.2 | 82 | 6.8 | 105 | 10.2 |
| EXAMPLE 2-4 | 1.5 | 3.4 | 52 | 2.8 | 42 | 4.2 |
| EXAMPLE 2-5 | 1.3 | 3.2 | 45 | 1.2 | 26 | 1.2 |
| EXAMPLE 2-6 | 1.6 | 4.2 | 74 | 5.6 | 89 | 7.4 |
| EXAMPLE 2-7 | 1.4 | 6.5 | 90 | 9.4 | 160 | 12.8 |
| EXAMPLE 2-8 | 1.5 | 3.9 | 72 | 5.5 | 84 | 5.6 |

TABLE 7

| SAMPLE | SINTERING ASSISTANT (wt %) | FIRING CONDITION (N$_2$ GAS ATMOSPHERE) |
|---|---|---|
| COMPARATIVE EXAMPLE 2-1 | 0.8% Y$_2$O$_3$ 1.2% Nd$_2$O$_3$ | 1900° C.-100 atm.-2 hr. 2000° C.-300 atm.-2 hr. |
| COMPARATIVE EXAMPLE 2-2 | 0.1% Y$_2$O$_3$ | 1900° C.-100 atm.-2 hr. 2000° C.-300 atm.-2 hr. |
| COMPARATIVE EXAMPLE 2-3 | 10% Y$_2$O$_3$ 5% Al$_2$O$_3$ | 1900° C.-100 atm.-2 hr. 2000° C.-100 atm.-2 hr. |
| COMPARATIVE EXAMPLE 2-4 | 1.2% Y$_2$O$_3$ 0.8% Nd$_2$O$_3$ | 1900° C.-100 atm.-2 hr. 2000° C.-300 atm.-8 hr. |
| COMPARATIVE EXAMPLE 2-5 | 1.2% Y$_2$O$_3$ 0.8% Nd$_2$O$_3$ | 1750° C.-10 atm.-8 hr. |
| COMPARATIVE EXAMPLE 2-6 | 1.2% Y$_2$O$_3$ 0.8% Nd$_2$O$_3$ | 1900° C.-100 atm.-2 hr. 2200° C.-300 atm.-2 hr. |

TABLE 8

| SAMPLE | $\frac{\beta}{\alpha+\beta}$ (wt %) | POROSITY (%) | THREE-POINT FLEXURAL STRENGTH AT ROOM TEMP. (MPa) | FRACTURE TOUGHNESS (MPa $\sqrt{m}$) | WEIBULL MODULUS |
|---|---|---|---|---|---|
| COMPARATIVE EXAMPLE 2-1 | 93 | 2 | 740 | 7.5 | 18 |
| COMPARATIVE EXAMPLE 2-2 | 97 | 12 | 450 | 4.3 | 35 |
| COMPARATIVE EXAMPLE 2-3 | 100 | 1.2 | 480 | 8.4 | 21 |
| COMPARATIVE EXAMPLE 2-4 | 100 | 0.8 | 520 | 8.8 | 19 |
| COMPARATIVE EXAMPLE 2-5 | 96 | 6 | 440 | 3.8 | 9.5 |
| COMPARATIVE EXAMPLE 2-6 | 100 | 2.5 | 380 | 7.4 | 12 |

| SAMPLE | MICRO STRUCTURE OF SINTERED BODY | | | | | |
|---|---|---|---|---|---|---|
| | A (μm) | B (μm) | C (μm) | D (%) | E (NUMBER/mm$^2$) | F (%) |
| COMPARATIVE EXAMPLE 2-1 | 1.2 | 8.2 | 180 | 18 | 240 | 18.6 |
| COMPARATIVE EXAMPLE 2-2 | 1.2 | 3.6 | 55 | 3.3 | 46 | 4.2 |
| COMPARATIVE EXAMPLE 2-3 | 2.9 | 11.4 | 183 | 38 | 350 | 28 |
| COMPARATIVE EXAMPLE 2-4 | 1.8 | 7.2 | 160 | 24 | 263 | 24 |
| COMPARATIVE EXAMPLE 2-5 | 0.9 | 3.2 | 9.4 | 0 | 14 | 0.8 |
| COMPARATIVE EXAMPLE 2-6 | 3.3 | 12.5 | 210 | 74 | 324 | 48 |

TABLE 9

BLENDED RATIO

TABLE 9-continued

| SAMPLE | BLENDED RATIO BETWEEN COARSE AND FINE POWDER | | SINTERING ASSISTANT (wt %) | FIRING CONDITION | | |
|---|---|---|---|---|---|---|
| | COARSE POWDER (wt %) | FINE POWDER (wt %) | | TEMP. (°C.) | $N_2$ GAS PRESSURE (atm.) | MAINTAINED TIME (hr.) |
| EXAMPLE 3-1 | 3 | 97 | 6% $Y_2O_3$ 3% $Al_2O_3$ | 1850 | 10 | 4 |
| EXAMPLE 3-2 | 5 | 95 | 8% $Y_2O_3$ 2% CaO | 1850 | 10 | 4 |
| EXAMPLE 3-3 | 10 | 90 | 6% $Y_2O_3$ 3% $Al_2O_3$ —3% MgO | 1900 | 100 | 4 |
| EXAMPLE 3-4 | 10 | 90 | 6% $La_2O_3$ 3% $Al_2O_3$ | 2000 | 100 | 2 |
| EXAMPLE 3-5 | 15 | 85 | 6% $CeO_2$ 3% $Nd_2O_3$ | 1950 | 100 | 1 |

| SAMPLE | CHARACTERISTICS OF SINTERED BODY | | | MICRO STRUCTURE OF SINTERED BODY [AMOUNT (vol %) OF COLUMNAR GRAIN HAVING (SHORTER AXIS) DIAMETER NOT LESS THAN 3 μm] |
|---|---|---|---|---|
| | DENSITY (g/cm³) | THREE-POINT FLEXURAL STRENGTH AT ROOM TEMP. (MPa) | FRACTURE TOUGHNESS (MPa $\sqrt{m}$) | |
| EXAMPLE 3-1 | 3.25 | 620 | 5.5 | 6 |
| EXAMPLE 3-2 | 3.28 | 650 | 6.5 | 10 |
| EXAMPLE 3-3 | 3.26 | 700 | 6.8 | 15 |
| EXAMPLE 3-4 | 3.28 | 680 | 7.3 | 18 |
| EXAMPLE 3-5 | 3.24 | 630 | 7.0 | 10 |

TABLE 10

| SAMPLE | BLENDED RATIO BETWEEN COARSE AND FINE POWDER | | SINTERING ASSISTANT (wt %) | FIRING CONDITION | | |
|---|---|---|---|---|---|---|
| | COARSE POWDER (wt %) | FINE POWDER (wt %) | | TEMP. (°C.) | $N_2$ GAS PRESSURE (atm.) | MAINTAINED TIME (hr.) |
| COMPARATIVE EXAMPLE 3-1 | 0 | 100 | 6% $Y_2O_3$ 3% $Al_2O_3$ —3% MgO | 1900 | 100 | 4 |
| COMPARATIVE EXAMPLE 3-2 | 10 | 90 | 6% $Y_2O_3$ 3% $Al_2O_3$ —3% MgO | 2200 | 100 | 4 |
| COMPARATIVE EXAMPLE 3-3 | 25 | 75 | 6% $Y_2O_3$ 3% $Al_2O_3$ —3% MgO | 1900 | 100 | 4 |

| SAMPLE | CHARACTERISTICS OF SINTERED BODY | | | MICRO STRUCTURE OF SINTERED BODY [AMOUNT (vol %) OF COLUMNAR GRAIN HAVING (SHORTER AXIS) DIAMETER NOT LESS THAN 3 μm] |
|---|---|---|---|---|
| | DENSITY (g/cm³) | THREE-POINT FLEXURAL STRENGTH AT ROOM TEMP. (MPa) | FRACTURE TOUGHNESS (MPa $\sqrt{m}$) | |
| COMPARATIVE EXAMPLE 3-1 | 3.28 | 410 | 4.5 | 3 |
| COMPARATIVE EXAMPLE 3-2 | 3.05 | 420 | 6.8 | 6 |
| COMPARATIVE EXAMPLE 3-3 | 3.02 | 480 | 6.8 | 15 |

TABLE 11

CHARACTERISTICS OF SINTERED BODY

TABLE 11-continued

| SAMPLE | PARTICLE SIZE (μm) OF FINE POWDER CORRESPONDING TO CUMULATIVE 90 wt % FROM FINE POWDER IN PARTICLE SIZE DISTRIBUTION | DENSITY (g/cm³) | THREE-POINT FLEXURAL STRENGTH AT ROOM TEMP. (MPa) | FRACTURE TOUGHNESS (MPa $\sqrt{m}$) | MICRO STRUCTURE [AMOUNT (vol %) OF COLUMNAR GRAIN HAVING (SHOTER AXIS) DIAMETER NOT LESS THAN 3 μm] |
|---|---|---|---|---|---|
| EXAMPLE 3-11 | 0.65 | 3.26 | 630 | 7.0 | 12 |
| EXAMPLE 3-12 | 0.60 | 3.25 | 690 | 7.2 | 15 |
| EXAMPLE 3-13 | 0.55 | 3.25 | 690 | 7.2 | 15 |

TABLE 12

| | | CHARACTERISTICS OF SINTERED BODY | | | |
|---|---|---|---|---|---|
| SAMPLE | PARTICLE SIZE (μm) OF FINE POWDER CORRESPONDING TO CUMULATIVE 90 wt % FROM FINE POWDER IN PARTICLE SIZE DISTRIBUTION | DENSITY (g/cm³) | THREE-POINT FLEXURAL STRENGTH AT ROOM TEMP. (MPa) | FRACTURE TOUGHNESS (MPa $\sqrt{m}$) | MICRO STRUCTURE [AMOUNT (vol %) OF COLUMNAR GRAIN HAVING (SHOTER AXIS) DIAMETER NOT LESS THAN 3 μm] |
| COMPARATIVE EXAMPLE 3-11 | 0.80 | 3.12 | 480 | 4.4 | 3 |
| COMPARATIVE EXAMPLE 3-12 | 1.00 | 3.01 | 400 | 4.8 | 5 |

TABLE 13

| | | | | | CHARACTERISTICS OF COARSE POWDER | | | |
|---|---|---|---|---|---|---|---|---|
| | HEATING CONDITION | | | | | | | AMOUNT (wt %) OF PARTICLES HAVING ASPECT RATIO BETWEEN 2 AND 10 AND (SHORTER AXIS) DIAMETER BETWEEN 0.5 μm AND 5 μm |
| SAMPLE | ASSISTANT OXIDE (wt %) | TEMP. (°C.) | TIME (hr) | ATMOSPHERIC N2 GAS PRESSURE (atm.) | AMOUNT OF β-SILICON NITRIDE (wt %) | (SHORTER AXIS) DIAMETER (μm) | ASPECT RATIO | |
| EXAMPLE 3-21 | 3% Y₂O₃—3% Al₂O₃ | 1550 | 1 | 1 | 98 | 1.5 | 4 | 95 |
| EXAMPLE 3-22 | 2% Y₂O₃—2% Nd₂O₃ | 1750 | 1 | 10 | 100 | 3.0 | 6 | 98 |
| EXAMPLE 3-23 | 2% La₂O₃—2% CeO₂ | 1800 | 1 | 10 | 100 | 4.5 | 8 | 92 |

| | CHARACTERISTICS OF SINTERED BODY | | | |
|---|---|---|---|---|
| SAMPLE | DENSITY (g/cm³) | THREE-POINT FLEXURAL STRENGTH AT ROOM TEMP. (MPa) | FRACTURE TOUGHNESS (MPa $\sqrt{m}$) | MICRO STRUCTURE OF SINTERED BODY [AMOUNT (vol %) OF COLUMNAR GRAIN HAVING (SHORTER AXIS) (DIAMETER NOT LESS THAN 3 μm] |
| EXAMPLE 3-21 | 3.26 | 620 | 6.2 | 12 |
| EXAMPLE 3-22 | 3.26 | 710 | 6.9 | 15 |
| EXAMPLE 3-23 | 3.24 | 730 | 7.2 | 16 |

TABLE 14

| | | | | | CHARACTERISTICS OF COARSE POWDER | | | |
|---|---|---|---|---|---|---|---|---|
| | HEATING CONDITION | | | | | | | AMOUNT (wt %) OF PARTICLES HAVING ASPECT RATIO BETWEEN 2 AND 10 AND (SHORTER AXIS) DIAMETER BETWEEN 0.5 μm AND 5 μm |
| SAMPLE | ASSISTANT OXIDE (wt %) | TEMP. (°C.) | TIME (hr) | ATMOSPHERIC N2 GAS PRESSURE (atm.) | AMOUNT OF β-SILICON NITRIDE (wt %) | (SHORTER AXIS) DIAMETER (μm) | ASPECT RATIO | |

TABLE 14-continued

| SAMPLE | | | | | | | | |
|---|---|---|---|---|---|---|---|---|
| COMPARATIVE EXAMPLE 3-21 | NIL | 1700 | 1 | 10 | 45 | 1.5 | 2 | 5 |
| COMPARATIVE EXAMPLE 3-22 | 5% Y₂O₃ | 1400 | 1 | 1 | 32 | 1.2 | 2 | 8 |
| COMPARATIVE EXAMPLE 3-23 | 5% Y₂O₃ | 2000 | 4 | 100 | 100 | 12 | 15 | 40 |

| SAMPLE | CHARACTERISTICS OF SINTERED BODY | | | MICRO STRUCTURE OF SINTERED BODY [AMOUNT (vol %) OF COLUMNAR GRAIN HAVING (SHORTER AXIS) (DIAMETER NOT LESS THAN 3 μm] |
|---|---|---|---|---|
| | DENSITY (g/cm³) | THREE-POINT FLEXURAL STRENGTH AT ROOM TEMP. (MPa) | FRACTURE TOUGHNESS (MPa $\sqrt{m}$) | |
| COMPARATIVE EXAMPLE 3-21 | 3.26 | 410 | 4.9 | 5 |
| COMPARATIVE EXAMPLE 3-22 | 3.27 | 420 | 4.6 | 3 |
| COMPARATIVE EXAMPLE 3-23 | 2.96 | 400 | 6.9 | 15 |

What is claimed is:

1. A method of producing a β-silicon nitride sintered body, comprising the following steps in the sequence set forth:

preparing powder of a starting material including β-silicon nitride in an amount not less than 80% by weight of the starting material;

adding oxide of at least one element selected from the group IIIa of the periodic table of elements in an amount ranging from 0.2% to 6% by weight to the starting material powder to form a mixture powder;

compacting said mixture powder to form a compact;

firing said compact under a nitrogen gas pressure ranging from 1 to 500 atm, at a temperature ranging from 1700° to 2100° C. to form the sintered body; and continuing the firing step until a bulk density of the sintered body reaches a value not less than 96% of a theoretical density of the sintered body;

wherein said starting material powder includes a first β-silicon nitride powder in an amount ranging from 80 to 98% by weight, and a second β-silicon nitride powder in an amount ranging from 2 to 20% by weight, said first β-silicon nitride powder including α-silicon nitride and β-silicon nitride which is in an amount not less than 95% by weight, said silicon nitride powder containing particles having a particle diameter not larger than 0.7 μm, in an amount not less than 90% by weight of total particles, said first β-silicon nitride powder having a means particle diameter not larger than 0.5 μm, said second β-silicon nitride powder including α-silicon nitride powder and β-silicon nitride powder which is in an amount not less than 95% by weight, said silicon nitride powder containing particles having an aspect ratio ranging from 2 to 10 and a shorter axis diameter ranging from 0.5 to 5 μm, in an amount not less than 70% by weight of total of said second β-silicon nitride powder.

2. A method of producing a β-silicon nitride sintered body, comprising the following steps in the sequence set forth below:

preparing a mixture powder by mixing a first β-silicon nitride powder in an amount ranging from 80 to 98% by weight, and a second β-silicon nitride powder in an amount ranging from 2 to 20% by weight, said first β-silicon nitride powder including α-silicon nitride and β-silicon nitride which is in an amount not less than 95% by weight, said first β-silicon nitride powder containing particles having a particle diameter not larger than 0.7 μm, in an amount not less than 90% by weight of total particles, said first β-silicon nitride powder having a mean particle diameter not larger than 0.5 μm, said second β-silicon nitride powder including α-silicon nitride powder and β-silicon nitride powder which is in an amount not less than 95% by weight, said silicon nitride powder containing particles having an aspect ratio ranging from 2 to 10 and a diameter ranging from 0.5 to 5 μm, in an amount not less than 70% by weight of total of said second β-silicon nitride powder;

adding to the mixture powder at least one selected from the group consisting of CaO, MgO, Al₂O₃ and oxides of elements of the group IIIa of the periodic table of elements, in an amount ranging from 0.2 to 15% by weight of the mixture;

compacting the mixture powder to form a compact; and firing the compact at a temperature ranging from 1600° to 2100° C. until the β-silicon nitride sintered body have columnar grains each of which has a diameter not less than 3 μm, in an amount not less than 5% by volume of the sintered body.

* * * * *